(12) United States Patent
Oishi

(10) Patent No.: US 6,298,153 B1
(45) Date of Patent: Oct. 2, 2001

(54) DIGITAL SIGNATURE METHOD AND INFORMATION COMMUNICATION SYSTEM AND APPARATUS USING SUCH METHOD

(75) Inventor: Kazuomi Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/229,440

(22) Filed: Jan. 13, 1999

(30) Foreign Application Priority Data

Jan. 16, 1998 (JP) .................................. 10-006629
Jan. 16, 1998 (JP) .................................. 10-006630

(51) Int. Cl.$^7$ ........................................ G06K 9/18
(52) U.S. Cl. .................... 382/186; 380/277; 380/44; 380/45; 380/30
(58) Field of Search .................... 382/186, 187, 382/188, 189, 190; 380/23, 50, 49, 25, 277, 44, 45, 30

(56) References Cited

U.S. PATENT DOCUMENTS

| | | | |
|---|---|---|---|
| 5,724,425 | * | 3/1998 | Change et al. .................... 380/25 |
| 5,867,578 | * | 2/1999 | Brickell et al. .................... 380/23 |
| 6,021,202 | * | 2/2000 | Anderson et al. .................... 380/25 |

FOREIGN PATENT DOCUMENTS

| | | |
|---|---|---|
| 8-108225 | 4/1996 | (JP) . |
| 8-108226 | 4/1996 | (JP) . |
| 9-108225 | 4/1997 | (JP) . |

OTHER PUBLICATIONS

D. Chaum and E. van Heyst, "Group Signatures, 'Advances in Cryptology–EUROCRYPT'" 91, pp. 257–265, Springer–Verlag, 1991.

* cited by examiner

Primary Examiner—Andrew W. Johns
Assistant Examiner—Seyed Azarian
(74) Attorney, Agent, or Firm—Fitzpatrick, Cella, Harper & Scinto

(57) ABSTRACT

A digital signature method including a public information generating step of generating public information specific to each user in accordance with a public parameter common to each user and secret information specific to each user, a signature generating step of generating a signature of digital information by converting the digital information by using the secret information and the public parameter, and a signature discrimination step of verifying whether a relation between the digital information and the signature is correct, by using the public parameter and the public information, has, a user information generating step of generating new secret information specific to the user, a new parameter, and new public information by using the public information, a confirmation step of confirming whether or not the new secret information, new parameter, and new public information generated by the user information generating step satisfy a predetermined relation, and an enciphering step of enciphering digital information by using the new parameter and the new public information confirmed by the confirmation step.

20 Claims, 9 Drawing Sheets

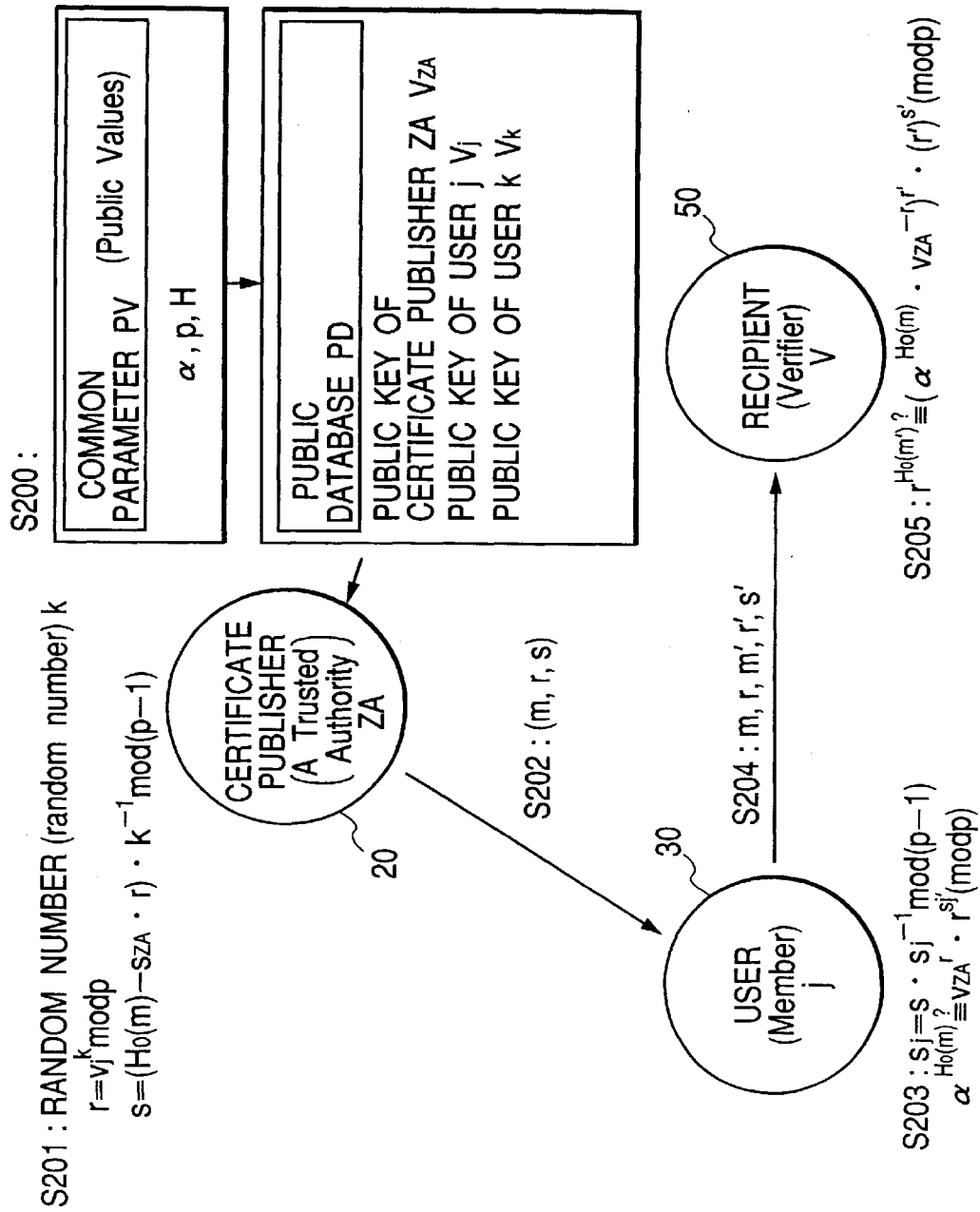

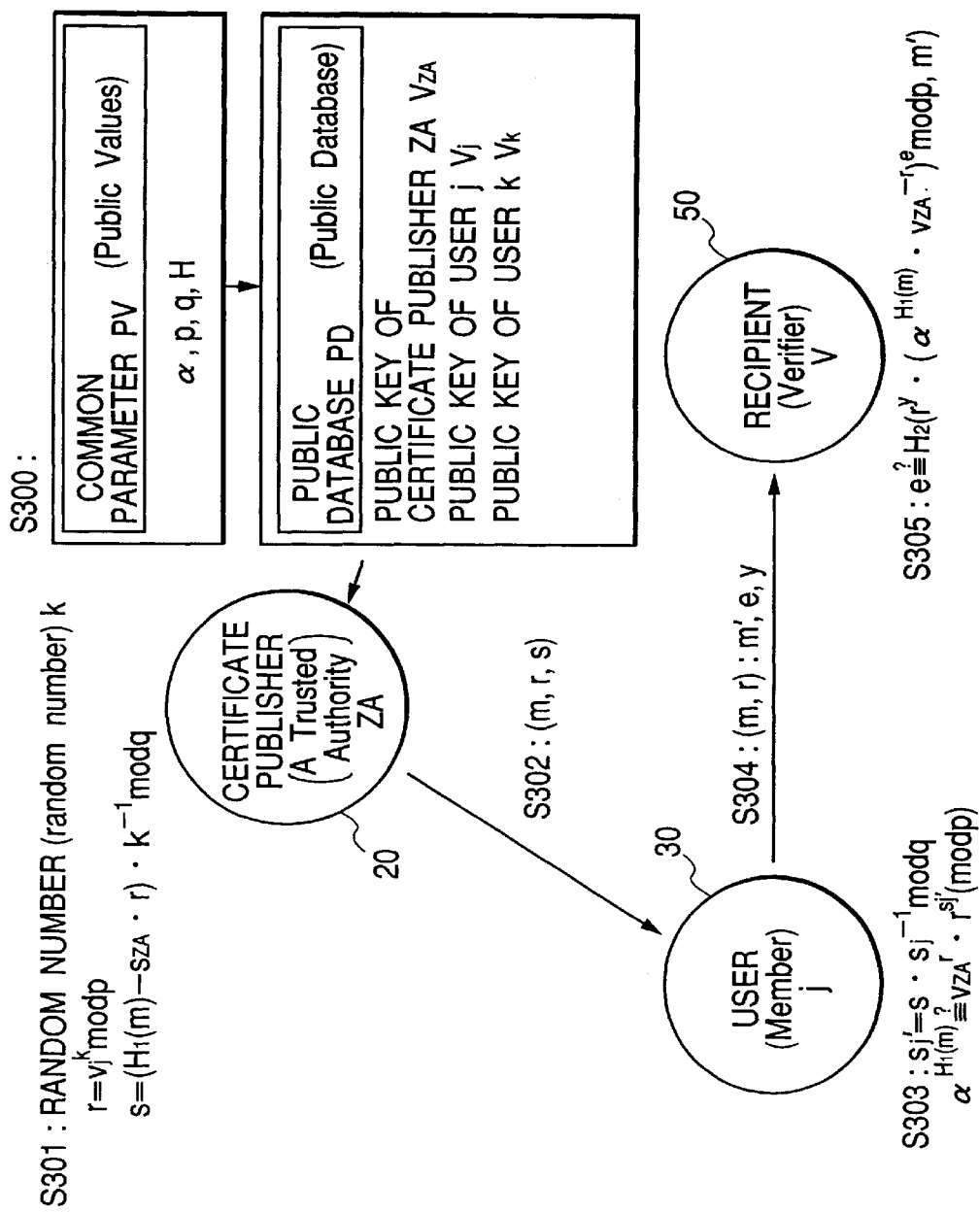

DIGITAL SIGNATURE METHOD AND INFORMATION COMMUNICATION SYSTEM AND APPARATUS USING SUCH METHOD

BACKGROUND OF THE INVENTION

1. Field of the Invention

The present invention relates to a digital signature method using a public key cryptogram, and an information communication system and apparatus using such a method.

2. Related Background Art

With developments and wide spreads of computers and communication networks, various functions such as social activities heretofore impossible on communication networks can be realized.

In some cases, however, it is easy for a third party to know a person, time, place, and contents during communications.

In order to prevent this, methods have been proposed which perform anonymous communications to protect privacy and realize various functions on communication networks.

For example, there is a method using a public key cryptogram. With this method, a sender can transmit communication contents only to a receiver the sender wishes to communicate, and the receiver can reliably confirm who is the sender of the received communication contents.

This method is applied to the digital signature method and an information communication system using this method disclosed in Japanese Patent Application Laid-open No. 9-108225.

"Cryptograph" and "Anonymous public key certificate" will be specifically described.

(1) "Cryptograph"

"Cryptograph" pertains information conversion in order for a third party not to recognize the meaning of information. In this cryptograph, an original text (still not converted) is called a "plain text", converting a plain text into a text (enciphered text) the third party cannot know the meaning thereof is called "encipher", and the conversion procedure is called a "cryptogram algorithm".

The plain text and enciphered text are not limited only to text data, but they may be any type of data such as voices and images.

Enciphering is a conversion dependent upon parameters called "enciphering keys". To restore the original plain text from the enciphered text is called "decipher". In deciphering an enciphered text, a parameter called a "deciphering key" corresponding to the enciphering key is used. To restore the original plain text from the enciphered text by a third party or to find a deciphering key is called "interpret".

Security of ciphers in such cryptograph depends on enciphering keys used for enciphering or deciphering keys used for deciphering. If it is impossible to know such a key, the plain text cannot be restored even if the cryptogram algorithm is known.

Therefore, cryptograph impossible to interpret even by a manufacture of an apparatus (cryptographic apparatus) for executing a predetermined cryptograph can be realized.

There are many cryptogram algorithms for a cryptosystem. For example, from the viewpoint of whether the enciphering key can be made public or not, the cryptography will be described by classifying it into an asymmetric cryptogram (public key cryptogram) and a symmetric cryptogram (common key cryptogram).

(1-1) "Asymmetric cryptogram (public key cryptogram)"

The "asymmetric cryptogram" is also called a "public key cryptogram". An enciphering key is different from a deciphering key, and the deciphering key is not easy to calculate from the enciphering key. The enciphering key is made public, and the deciphering key is kept in secret.

Such an asymmetric cryptogram has the following features:

Feature 1: Since the enciphering key is different from the deciphering key and the enciphering key is made public, it is not necessary to send the enciphering key in secret.

Feature 2: Since the enciphering key of each user is made public, each user is required only to have its deciphering key in secret.

Feature 3: A certification (digital signature) function can be realized in order for a receiver to confirm that the sender of a communication text is not a pretender and that the communication text was not altered.

As the asymmetric cryptogram capable of realizing a cryptograph function and the certification function, an RST cryptosystem and an ElGamal cryptosystem are known.

As the asymmetric cryptogram capable of realizing the certification function, a Fiat-Shamir cryptosystem and a Schnorr cryptosystem are known.

Enciphering, deciphering, generation of a certificate (digital signature), and verification of the certificate regarding, for example, to the ElGamal cryptosystem will be described specifically.

It is assumed that "Z" is a set of all integers, "$Z_p$" is a set of integers of 0 or larger and smaller than p, "$Z_p\backslash\{0\}$" is a set $Z_p$ without 0, and "$Z_p^*$" is a set of integers prime to an element of $Z_p$ and p.

If integers A, B, and C satisfy the following relation

A=B mod C, then it means that the remainder of B divided by C is A (that a relation of "B=k·C+A" is satisfied where k is an arbitrary integer).

If the integers A, B, and C satisfy the following relation

A≡B (mod C), then it means that the remainder of A divided by C is equal to the remainder of B divided by C.

Used as the public parameters shared by each communication partner are a prime p, α which is an element of $Z_p^*$ and an order p−1, and a one way hash function $H_0: Z \rightarrow Z_p\backslash\{0\}$. A deciphering key (secret key) of an arbitrary user i is represented by "$s_i \in Z_{p-1}$" and an enciphering key (public key) is represented by "$v_i = \alpha^{s_i}$ mod p".

The "one way hash function" is a compression function hard to generate collision. Namely, the "one way hash function" is a function of outputting a bit train having a desired length and is difficult to calculate an input which obtains the same output.

(a) Enciphering

When a user j enciphers a plain text (message) m ($\in Z_p$) and transmits it to a user i, a user j terminal device executes the sequence from the following Step 1 to Step 4.

If the message m is not made of elements of $Z_p$, i.e., if the message is made of elements larger than p, the message m is divided into blocks each being made of elements of $Z_p$. Each block is enciphered by the following sequence.

Step 1: The user j terminal device generates a random number k.

Step 2: The user j terminal device calculates $C_1 = \alpha^k$ mod p.

Step 3: The user j terminal device calculates $C_2 = m \cdot v_i^k$ mod p.

Step 4: The user j terminal device transmits the calculation results $C_1$ and $C_2$ at Steps 2 and 3 to the user i terminal device.

(b) Deciphering

With the above enciphering (a), the user j terminal device transmits $C_1$ and $C_2$ to the user i terminal device. By using $C_1$ and $C_2$ transmitted from the user j terminal device, the user j terminal device recovers the message m by calculating $m=C_2/C_1^{si}$ mod p.

(c) Generation of Digital Signature

In generating a digital signature of the message m ($\in Z$), the user i terminal device executes the sequence from the following Step 1 to Step 4.

Although the message m is divided into blocks in some case as described in the enciphering (a), in the following example, the one way hash function is used.

Step 1: The user i terminal device generates a random number k ($\in Z_{p-1}^*$).

Step 2: The user i terminal device calculates $$r=\alpha^k \bmod p.$$

Step 3: The user i terminal device calculates $$s=(H_0(m)-s_i \cdot r) \cdot k^{-1} \bmod (p-1).$$

Step 4: The user i terminal device transmits the calculation results r and s at Steps 2 and 3 to a verifier.

(d) Verification of Digital Signature

In verifying the digital signature generated by the generation of digital signature (c), the user i terminal device checks whether the following relation is satisfied:

$$\alpha^{H_0(m)} \equiv v_i^r \cdot r^s (\bmod p).$$

(1-2) "Symmetric cryptogram (common key cryptogram)"

The "symmetric cryptogram" is also called a "common key cryptogram". An enciphering key is the same as a deciphering key. After the advent of the above-described asymmetric cryptogram (public key cryptogram) during the last half of 1970's, the symmetric cryptogram was also called a "conventional cryptogram".

Such a symmetric cryptogram is classified into a block cryptogram in which each character string (block) having an appropriate length is enciphered by using the same enciphering key and a stream cryptogram in which each character string or each bit is enciphered by a different enciphering key.

The block cryptogram includes a transposition cryptogram in which the order of characters is transposed for enciphering, a character change cryptogram in which a character is changed to a different character, and the like. The block cryptogram is widely used and there are commercially available cryptosystems such as DES (Data Encryption Standard) and FEAL (Fast data Encipherment Algorithm).

In the stream cryptogram, the contents of a message are disturbed through XOR (exclusive sum) of the message and random numbers. As the stream cryptogram, a Vernam cryptosystem is known in which a random number train of an infinite period is used once as an enciphering key and thereafter it is discarded.

(2) "Anonymous Public Key Certificate"

The "anonymous public key certificate" certifies a correspondence between an arbitrary user and its public key (enciphering key) of the above-described asymmetric cryptogram (public key cryptogram) (1-1) or the like.

Specifically, a trusted and specific user called "Certificate Authority" (hereinafter called CA) confirms an identity of another user (hereinafter a user j) from a passport, for example, and generates a digital signature of a message whose contents are identification information ID (personal identification information such as name, gender, year, month, and date of birth) of the user j, a public key, an effective period, and the like. This digital signature is the "anonymous public key certificate".

The public key of CA can be accessed reliably by any one so that it is easy to verify the digital signature generated by CA. It is therefore possible to easily and reliably confirm the public key of a user j communicating with a user k and to prevent another user from becoming the illegal user j during communications in the public key cryptogram.

The user of the "anonymous public key certificate" cannot be identified from another user. Therefore, this anonymous public key certificate can be used when privacy should be protected, for example, when a user having a privilege of receiving special services does not want to publicize its identity.

For example, a communication system disclosed in Japanese Patent Laid-open Publication No. HEI-8-108225 adopts such an anonymous public key certificate.

This communication system executes the sequence from Steps S500 to S504 shown in FIG. 1.

Steps S500 to S504 will be described specifically.

Each symbol ("Z", "$Z_p$", ...) in the following description is assumed to be defined in the similar manner to those symbols described earlier with the ElGamal cryptosystem.

Step S500: Commonly used as public parameters PV (Public Values) of a system are a prime p, an order q (where, q|p−1), α which is an element of $Z_p^*$ and an order q, and a one way hash function $H_1:Z_q \times Z \rightarrow \{0, \ldots, 2^t-1\}$.

The order q can divide p−1 without any remainder. $\alpha^x \equiv 1$ (mod p) is not satisfied if $x \in Z_q \setminus \{0\}$ and $\alpha^x \equiv -1$ (mod p) is satisfied if x=q. $H_1$ is input with elements of $Z_q$ and Z and outputs integers of $2^t-1$ or smaller which are not negative.

It is assumed that these parameters can be accessed by all users participating in this communication system and are registered in a public database PD properly managed so as not to be illegally altered or the like.

A certificate publisher (authority) Q terminal device 70 generates a deciphering key (secret key) $s_Q$ and an enciphering key (public key) $v_Q$ ($v_Q = \alpha^{-s_Q}$ mod p) and registers the public key $v_Q$ in the public database PD.

A user j terminal device 80 generates a deciphering key (secret key) $s_j$ and an enciphering key (public key) $v_j$ ($v_j = \alpha^{-s_j}$ mod p) and registers the public key $v_j$ in the public database PD.

Step S501: Generation of Anonymous Public Key Certificate

Next, the certificate publisher (authority) Q terminal device 70 obtains z which is converted from the public key $v_j$ of the user j by using a random number r, and generates a signature (digital signature of the Schnorr cryptosystem) of z.

More specifically, the certificate publisher (authority) Q terminal device 70 selects the random number (secret random number) r ($r \in Z_q \setminus \{0\}$) and calculates:

$$x=\alpha^r \bmod p$$

$$z=v_j^r \bmod p$$

$$e=H_1(x, z_j)$$

$$y=r+e \cdot s_Q \bmod q.$$

The digital signature (y, e, z) of the Schnorr cryptosystem is the anonymous public key certificate.

Step S502: Delivery of Anonymous Public Key Certificate

Next, the certificate publisher (authority) Q terminal device 70 transmits the anonymous public key certificate (y, e, z) generated at Step S501 to the user j terminal device 80.

Upon reception of the certificate, the user j terminal device 80 confirms whether the following equations are satisfied:

$$e = H_1(\alpha^y \cdot v_Q^e \bmod p, z)$$

$$z = (\alpha^y \cdot v_Q^e \bmod p)^{-sj} \bmod p.$$

In this example, since $x = \alpha^y \cdot v_Q^e \bmod p$ is satisfied, x is used for the simplicity of notation.

Step S503: Use of Public Key Cryptogram

Next, the user j terminal device 80 uses the public key cryptogram basing upon a discrete logarithm problem, by using x and z in place of $\alpha$ and $v_j$.

For example, if a digital signature of the Schnorr cryptosystem is used, a digital signature of a message m is generated in the following manner.

The user j terminal device 80 selects a secret random number $r_j$ ($r_j \in Z_q^*$) and calculates:

$$x_j = x^{r_j} \bmod p$$

$$e_j = h(x_j, m)$$

$$y_j = r_j + e_j \cdot s_j \bmod q.$$

The user j terminal device 80 transmits the message m and the digital signature ((y, e, z), $y_j$, $e_j$, m) to a desired communication partner.

Step S504: Verification of Signature

A receiver (communication partner (verifier)) i terminal device 90 received the digital signature ((y, e, z), $y_j$, $e_j$, m) transmitted at Step S503 verifies the equations at Step S502, first $$e_j = H_1(\alpha^y \cdot v_Q^e \bmod p, z), \text{ and then}$$

$$e_j = H_1(x^{y_j} \cdot z^{e_j} \bmod p, m).$$

After this verification, the receiver i terminal device 90 can recognize that the digital signature of the message m was generated by the user identified by the certificate publisher Q.

(3) "Group Signatures"

The "group signatures" are digital signatures proposed by D. Chaum. E. van Heyst, "Group Signatures, 'Advances in Cryptology-EUROCRYPT' 91, PP. 257–265, Springer-Verlag, 1991", and have the following features.

Feature 1: Only the member of the group can make signature.

Feature 2: Although a member received a signature can confirm whether or not it is a right signature, the member who made signature cannot be identified.

Feature 3: The signature may be disclosed thereafter, when necessary, with or without a help of a group member in order to identify the signed member.

The application field of the group signatures is, for example, a tender system. In this tender system, tenderers participating a desired tender constitute members of the tender system. Each tenderer makes a group signature for its price and conditions. In this manner, if no tenderer is accepted, it cannot know the price and conditions put by each tenderer, whereas if some tenderer is accepted, the accepted tenderer or signed member can be made public.

The group signatures are disclosed, for example, in Japanese Patent Laid-open Publication HEI-8-108226. The group signatures disclosed in this Publication use an anonymous public key certificate.

The "anonymous public key certificate" certifies a correspondence between an arbitrary user and its public key (enciphering key) of the above-described asymmetric cryptogram (public key cryptogram) or the like, and functions like a certificate of a seal impression.

More specifically, the "anonymous public key certificate" is a digital signature of a message constituted of a public key, identification information of a user having the public key, and the like, and is generated by a trusted and specific user. The "anonymous public key certificate" hides the identity of a user (entity) having the public key. Such an "anonymous public key certificate" is disclosed, for example, in Japanese Patent Application Laid-Open No. 8-108225.

In the case of the group signatures disclosed in the above-cited Japanese Patent Application Laid-open No. 8-108226, an arbitrary and trusted authority (hereinafter called ZA) issues an anonymous public key certificate to each member of the group. Upon reception of this certificate, the member generates a digital signature by using the certificate and a secret key of the member. A combination of the anonymous public key certificate and the generated digital signature constitutes a group signature.

The member received the group signature can know that another member admitted by ZA, i.e., a member in the group made signature. However, the signed member cannot be identified because of anonymity of the anonymous public certificate. When it becomes necessary to identify the signed member, the singed member can be made public.

The conventional anonymous public key certificate used in the above-described communication system satisfies anonymity only under the following conditions. Namely, the identity of a member having an anonymous public key certificate cannot be known. Such anonymity is based upon the following two assumptions.

Assumption 1: Discrete Logarithm Problem It is assumed that "G" is a finite group, "$\alpha$" is a generator of the finite group, "v" is an element of G, and a "log [$\alpha$] v" is a discrete logarithm of v relative to a base A. In this case, if the order (number of elements) of G is sufficiently large, it is difficult to calculate the discrete logarithm log [$\alpha$] v.

Assumption 2: Comparison Problem of Discrete Logarithms

It is assumed that "r" and "s" are random elements of G.

If $\alpha$, $v = \alpha^s$, $x = \alpha^r$, and $z = \alpha^{rs}$ are given, the order of G is sufficiently large, and r and s are unknown, then it is impossible to judge whether or not log [$\alpha$] v is equal to log [x] z.

Anonymity of the anonymous public key certificate can be satisfied if the above assumptions 1 and 2 are satisfied.

However, an algorithm for solving the assumption 2 only has been found, and anonymity of the anonymous public key certificate is lost in some case because the assumption 2 is not satisfied although the assumption 1 is satisfied.

More specifically, it is believed from studies made to date that solving the discrete logarithm problem of the assumption 1 is very difficult. It is therefore proper to consider that security can be maintained. If the discrete logarithm problem can be solved, the comparison problem of the discrete logarithms of the assumption 2 can be solved. It can be understood therefore that solving the assumption 2 is as easy as, or easier than, solving the assumption 1.

It is not certain at the present as to how easier to solve the assumption 2 than to solve the assumption 1. However, with an algorithm for solving the assumption 2 only, there may be a case that the assumption 2 is not satisfied although the assumption 1 is satisfied. In such a case, anonymity of the anonymous public key certificate is lost.

SUMMARY OF THE INVENTION

It is an object of the present invention to eliminate the above-described disadvantages and provide a digital signature method capable of reliably ensuring anonymity under any circumstance, and an information system and apparatus using such a method.

According to one embodiment of the invention, there are at least means for generating a digital signature such as a signature in the ElGamal cryptosystem, means for converting the generated digital signature by using secret information of each user, and means for using a public key cryptogram whose basis of security relies upon a discrete logarithm problem.

With this configuration, the digital signature generating means generates a digital signature of digital information such as an arbitrary plain text and predetermined fixed values, by using public information of each user in place of a commonly used public parameter. The digital signature converting means generates another value by converting the digital signature by using the secret information of each user. The public key cryptogram using means uses the public key cryptogram whose basis of security relies upon the discrete logarithm problem, by using as the public information the digital information, digital signature, public parameter, and a value obtained from a public key of the user made signature and by using as the user secret information the other value obtained through conversion of the digital signature. Each user uses the public key cryptogram by using the public key cryptogram using means.

It is therefore possible from a standpoint of information amount to identify the user in accordance with the information (public information) used by the user as the public key. Therefore, anonymity does not depend upon the assumption 2 (comparison problem of discrete logarithms). Namely, even if there occurs the case wherein the assumption 2 is not satisfied, anonymity can be retained.

More specifically, according to an embodiment, a digital signature method including a public information generating step of generating public information specific to each user in accordance with a public parameter common to each user and secret information specific to each user, a signature generating step of generating a signature of digital information by converting the digital information by using the secret information and the public parameter, and a signature discrimination step of verifying whether a relation between the digital information and the signature is correct, by using the public parameter and the public information, comprises: a user information generating step of generating new secret information specific to the user, a new parameter, and new public information by using the public information; a confirmation step of confirming whether or not the new secret information, new parameter, and new public information generated by the user information generating step satisfy a predetermined relation; and an enciphering step of enciphering digital information by using the new parameter and the new public information confirmed by the confirmation step.

According to another embodiment, a digital signature method including a public information generating step of generating public information specific to each user in accordance with a public parameter common to each user and secret information specific to each user, a first signature generating step of generating a signature of digital information by converting the digital information by using the secret information and the public parameter, and a first signature discrimination step of verifying whether a relation between the digital information and the signature is correct, by using the public parameter and the public information, comprises: a user information generating step of generating new secret information specific to the user, a new parameter, and new public information by using the public information; a confirmation step of confirming whether or not the new secret information, the new parameter, and the new public information generated by the user information generating step satisfy a predetermined relation; and a second signature generating step of generating a signature of digital information by using the new parameter and the new public information confirmed by the confirmation step.

According to another embodiment, a digital signature method including a public information generating step of generating public information of each user, the public information being a result of an exponent calculation using a base value common to a plurality of users and secret information of each user as an exponent value, comprises: a secret information generating step of generating new secret information of a user in accordance with a signature of a plain text generated by using the public information of the user as the common base value and the secret information of the user; a parameter generating step of generating a new parameter corresponding to the new secret information generated by the secret information generating step; a public information generating step of generating new public information of the user in accordance with the signature, the public information of the user, the common base value, and the plain text; and a cryptogram execution step of executing a public key cryptogram by using the new secret information generated at the secret information generating step, the new parameter generated at the parameter generating step, and the new public information generated by the public information generating step.

According to another embodiment, a communication apparatus for executing a digital signature method, comprises: public information generating means for generating public information specific to each user in accordance with a public parameter common to each user and secret information specific to each user; signature discriminating means for verifying whether a relation between received digital information and a signature of the received digital information is correct, by using the public parameter and the public information; user information generating means for generating new secret information specific to the user, a new parameter, and new public information by using the public information; confirming means for confirming whether or not the new secret information, the new parameter, and the new public information generated by the user information generating means satisfy a predetermined relation; and enciphering means for enciphering digital information by using the new parameter and the new public information confirmed by the confirming means.

According to another embodiment, a communication apparatus for executing a digital signature method, comprises: public information generating means for generating public information of each user, the public information being a result of an exponent calculation using a base value common to a plurality of users and secret information of each user as an exponent value; secret information generating means for generating new secret information of a user in accordance with a signature of digital information generated by using the public information of the user as the common base value and the secret information of the user; parameter generating means for generating a new parameter corresponding to the new secret information generated by the secret information generating means; public information generating means for generating new public information in accordance with the signature, the public information, the common base value, and the digital information; and cryptogram executing means for executing a public key cryptogram by using the new secret information generated by the secret information generating means, the new parameter generated by the parameter generating means, and the new public information generated by the public information generating means.

According to one embodiment of the invention, there are at least means for generating a digital signature such as a signature in the ElGamal cryptosystem, means for transmitting in secret the generated digital signature to each user, means for converting the generated digital signature by using secret information of each user, means for using a public key cryptosystem whose basis of security relies upon a discrete logarithm problem, and means for storing a random number corresponding to the digital signature such as a signature in the ElGamal cryptogram.

With this configuration, the digital signature generating means generates a digital signature of digital information such as an arbitrary plain text and predetermined fixed values, by using public information of each user in place of a commonly used public parameter. The means for transmitting in secret the digital signature to each user, transmits in secret the generated digital signature to each user. The means for converting the digital signature by using the secret information of each user, obtains another value by converting the digital signature transmitted in secret by the transmitting means by using the secret information of the user. The means for using the public key cryptosystem whose basis of security relies upon the discrete logarithm problem, generates a digital information by using as the public information the digital information, digital signature, and a value obtained from public information of the user made signature and by using as the user secret information a value converted from the digital signature. When an arbitrary digital signature is given, a user made the digital signature is identified and made public by searching information, i.e., a random number corresponding to the digital signature, stored in the means for storing each random number corresponding to the digital signature.

Since it is impossible from a standpoint of information amount to identify the user in accordance with the information (public information) used by the user as the public key, anonymity depends upon the assumption 2 (comparison problem of discrete logarithms). Namely, even if there occurs the case wherein the assumption 2 is not satisfied, anonymity can be retained.

When a new group is formed or a new member is added to the existing group, the authority generates a digital signature such as a signature in the ElGamal cryptosystem in accordance with the public information of a member, and transmits in secret the digital signature to the member. Since the member can generate a group signature by using its secret information and the received digital signature, only one-way communication is performed from the authority to the member. Namely, it is not necessary to perform conventional two-way communication between the member and authority.

More specifically, according to an embodiment, a digital signature method comprises: a public information generating step of generating public information specific to each user in accordance with a public parameter common to each user and secret information specific to each user; a member information generating step of generating member information by an authority of a group in accordance with the public information specific to each user belonging to the group, the member information including new secret information, a new parameter, and new public information; a secrecy communication step of transmitting in secret the member information generated at the member information generating step to a user belonging to the group; a member information confirmation step of confirming whether or not the member information generated at the member information generating step satisfies a predetermined relation; a signature generating step of generating a signature corresponding to digital information by using the member information confirmed by the member information confirmation step; a signature confirmation step of confirming whether or not the member information confirmed at the member information confirmation step and the signature generated at the signature generating step are valid, by using the public information generated by the authority; and a signed user identifying step of identifying a user made the signature in accordance with a random number used when the signature is generated at the signature generating step.

According to another embodiment, a communication apparatus for communications between authority communication means of an arbitrary group and communication means of another user by using a digital signature method, comprises: public information generating means for generating specific public information in accordance with a common public parameter and specific secret information; member information confirming means for confirming whether or not member information satisfies a predetermined relation, the member information being generated by the authority communication means in accordance with the public information, transmitted therefrom in secret, and including new secret information, a new parameter, and new public information; signature generating means for generating a signature corresponding to digital information by using the member information confirmed by the member information confirming means; transmitting means for transmitting the signature generated by the signature generating means to another user; and signature verifying means for verifying a signature of the other user by using the public information of the authority.

According to another embodiment, a communication apparatus for an authority of an arbitrary group for communicating with user communication means of a user at least belonging to the group by using a digital signature method, comprises: public information generating means for generating specific public information in accordance with a common public parameter and specific secret information; member information generating means for generating new secret information, a new parameter, and new public information in accordance with the public information specific to a user belonging to the group; secrecy communication means for transmitting in secret the member information generated by the member information generating means to the user communication means of a user belonging to the group; and singed user identifying means for identifying a user made a signature corresponding to digital information in accordance with a random number used for the signature generated by using the member information, if the user communication means of the user belonging to the group confirms that the member information generated by the member information generating means satisfies a predetermined relation.

BRIEF DESCRIPTION OF THE DRAWINGS

FIG. 8 is a diagram illustrating a group signature of the communication system shown in FIG. 6.

FIG. 9 is a diagram illustrating a group signature of the communication system shown in FIG. 6, according to a fifth embodiment of the invention.

DETAILED DESCRIPTION OF THE PREFERRED EMBODIMENTS

Embodiments of the invention will be described with reference to the accompanying drawings.

The first embodiment will be described.

Figure 2:
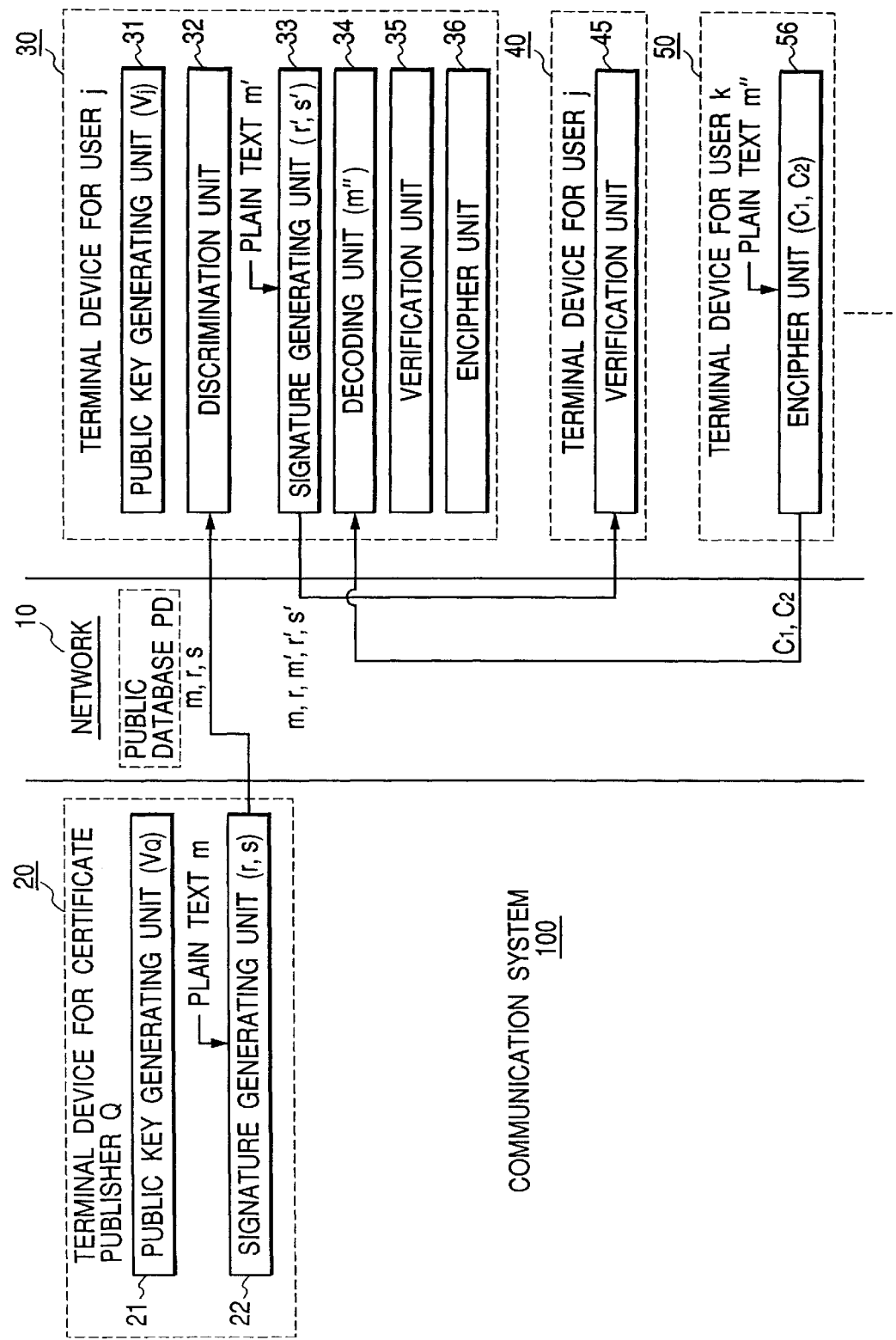
FIG. 2 is a block diagram showing a communication system utilizing an information communication system according to a first embodiment of the invention.

The digital signature method of this invention is executed by a communication system 100 such as shown in FIG. 2. The communication system 100 utilizes an information communication system of the invention.

In the communication system 100, a certificate publisher Q terminal device 20 and a plurality of user terminal devices 30, 40, 50, . . . of users j, i, k, . . . are connected to a network 10. Each terminal device communicates with another terminal device via the network 10. The communication system 100 is provided with a public database PD which manages public parameters PV (Public Values) shared by users.

The certificate publisher Q terminal device 20 has a public key generating unit 21 and a signature generating unit 22, the former generating a secret key $s_Q$ (secret information) specific to the certificate publisher Q and a public key $v_Q$ (public information) and the latter generating a signature (anonymous public key certificate) of a plain text by using the secret key $s_Q$ and a public parameter PV.

The user terminal devices 30, 40, 50, . . . each have the same structure.

For example, the user j terminal device 30 has a public key generating unit 31 for generating a secret key $s_j$ specific to the user and a public key $v_j$, a discrimination unit 32 for judging whether a correspondence between the plain text m and the signature is correct, and a signature generating unit 33 for generating a new signature.

The user j terminal device 30 also has a verification unit 35 for verifying the new signature, an encipher unit 36 for enciphering the plain text by using the new signature verified by the verification unit 35, and a decoding (decipher) unit 34 for deciphering the enciphered text by using the new signature verified by the verification unit 35.

The operation of the communication system 100 constructed as above will be described with reference to FIGS. 2 and 3.

Figure 1:
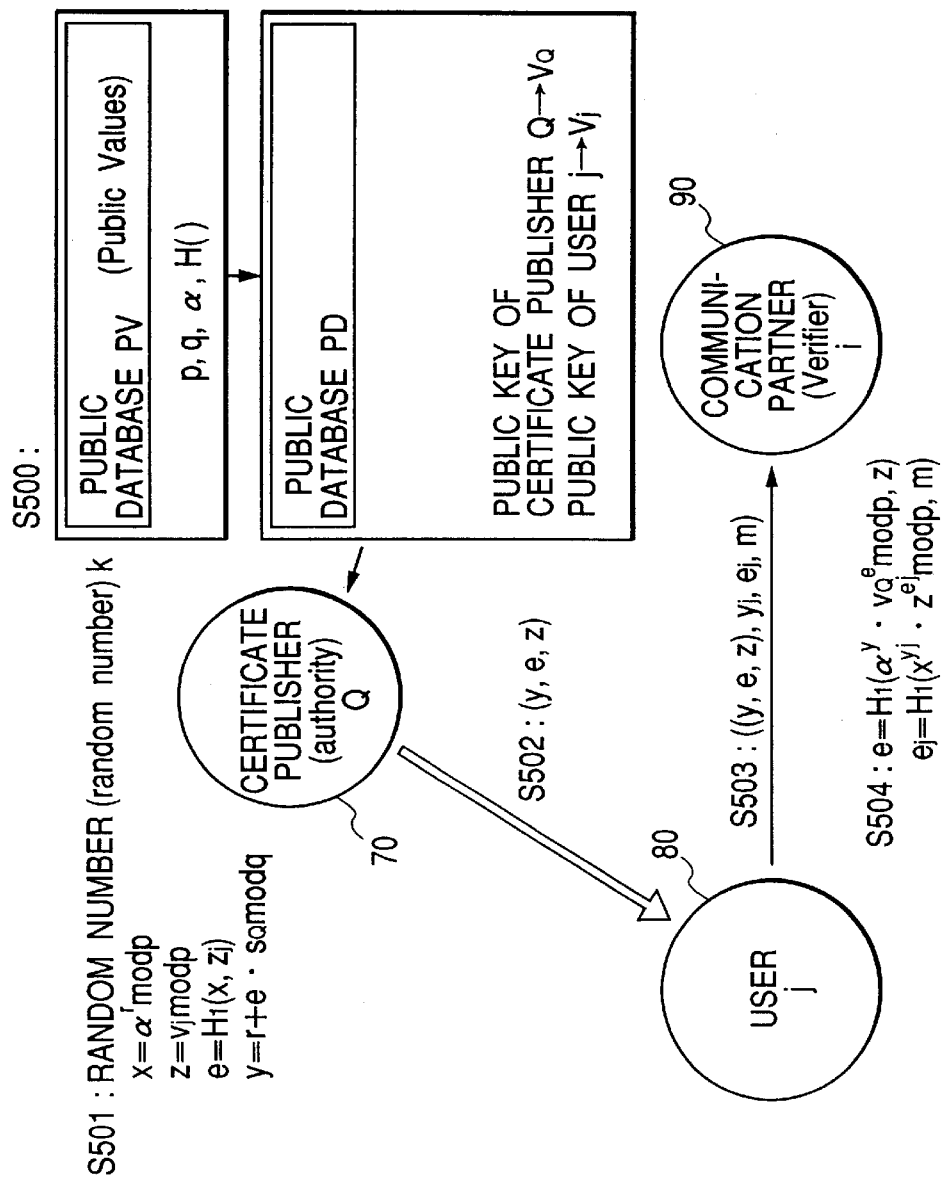
FIG. 1 is a diagram illustrating a conventional digital signature method.
Figure 3:
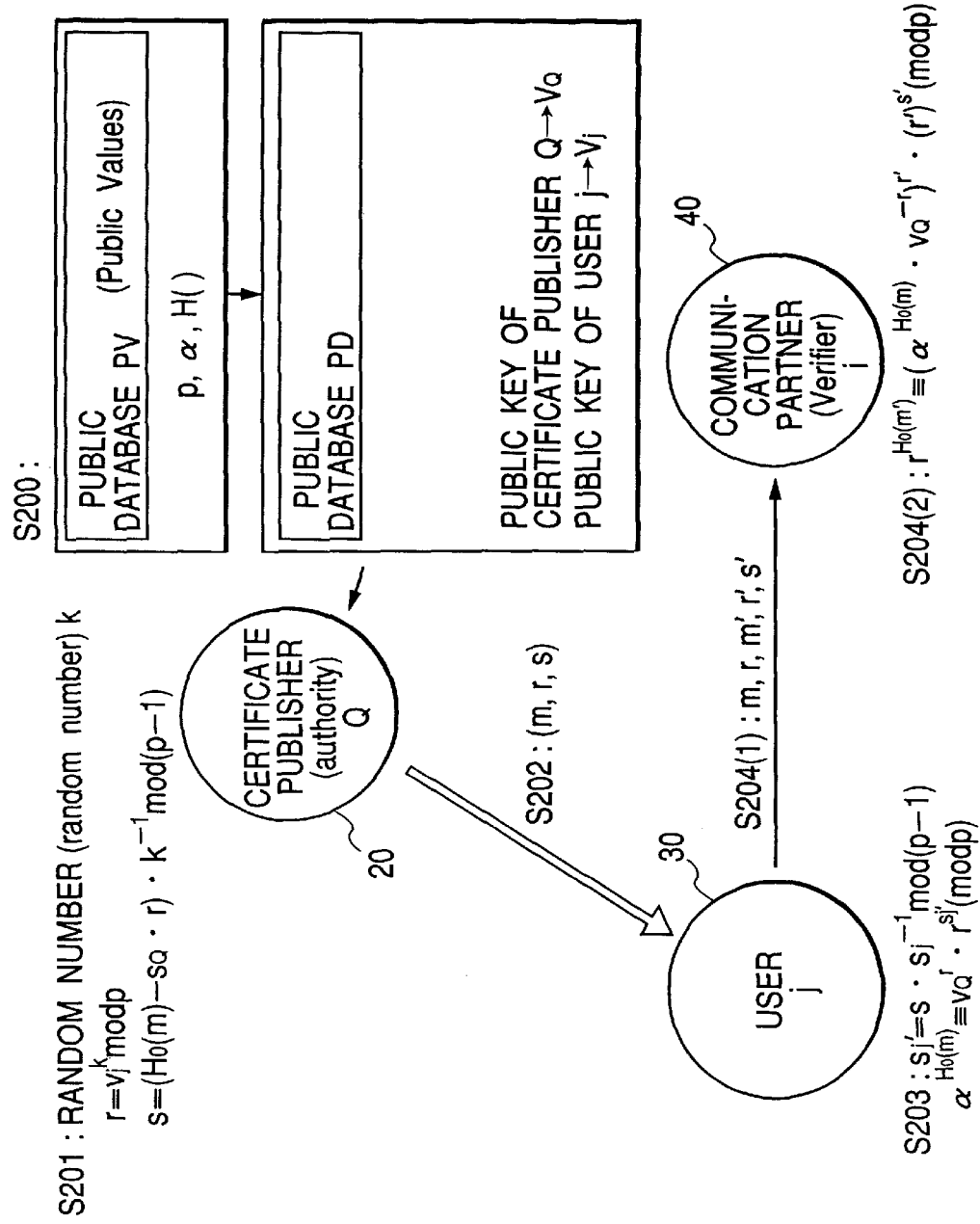
FIG. 3 is a diagram illustrating a digital signature method to be executed by the information system shown in FIG. 2.

Symbols shown in FIG. 3 conform with the notation rules similar to FIG. 1.

Step S200: Used as common data of the communication system 100 are a large prime p, $\alpha$ which is an element of $Z_p^*$ and an order p−1, and a one way hash function $H_0: Z \to Z_p \setminus \{0\}$.

It is assumed herein that p is "$p > 2^{512}$".

These parameters can be accessed by all users participating in the communication system 100 and are registered in the public database PD properly managed so as not to be illegally altered or the like.

In the certificate publisher (authority) Q terminal device 20, the public key generating unit 21 generates a secret key $s_Q$ ($\in Z_{p-1}^*$) and a public key $v_Q$ ($v_Q = \alpha^{s_Q}$ mod p) and registers the public key $v_Q$ in the public database PD.

In a user terminal device (in this example, the user j terminal device 30), the public key generating unit 31 generates a deciphering key (secret key) $s_j$ ($\in Z_{p-1}^*$) and an enciphering key (public key) $v_j$ ($v_j = \alpha^{s_j}$ mod p) and registers the public key $v_j$ in the public database PD.

Step S201: Generation of Anonymous Public Key Certificate

In the certificate publisher Q terminal device 20, the signature generating unit 22 obtains r which is converted from the public key $v_j$ of the user j by using a random number k, and generates a signature (e.g., a digital signature of the ElGamal cryptosystem) of the plain text m.

More specifically, the signature generating unit 22 selects the random number (secret random number) k (k $\in Z_{p-1}^*$) and calculates:

$r = V_j^k$ mod p $s = (H_0(m) - s_Q \cdot r) \cdot k^{-1}$ mod (p−1).

The digital signature (r, s) of the ElGamal cryptosystem of the plain text m is the anonymous public key certificate. The plain text m may be used as a parameter representative of the type of the anonymous public key certificate.

As the parameter representative of the type of the anonymous public key certificate, a predetermined fixed value may be used instead of the plain text m or $H_0(m)$.

Step S202: Delivery of Anonymous Public Key Certificate

Next, the certificate publisher Q terminal device 20 transmits as the anonymous public key certificate (m, r, s) the digital signature r and s generated by the signature generating unit 22 and the parameter m representative of the type of the anonymous public key certificate to the user j terminal device 30.

Step S203: Upon reception of the certificate, in the user j terminal device 80, the discrimination unit 32 obtains $s_j' = s \cdot s_j^{-1}$ mod (p−1), and confirms whether the following is satisfied:

$\alpha^{H_0(m)} \equiv v_Q^r \cdot r^{s_j'}$ (mod p)

Step S204: Use of Public Key Cryptogram

The user j terminal device 30 uses the public key cryptogram basing upon the discrete logarithm problem, in accordance with $$\alpha^{H0(m)} \cdot v_Q^{-r} \equiv r^{s_j'} \pmod{p}$$

where "r" is a base, "$\alpha^{H0(m)} \cdot v_Q^{-r}$ mod p" is a public key, and "$s_j'$" is a secret key.

It is assumed herein that a digital signature of the ElGamal cryptosystem is used.

Step S204 (1): Generation of Digital Signature

In the user j terminal device 30, the signature generating unit 33 generates a signature of a plain text m' as in the following.

(1) The signature generating unit 33 generates a random number k' ($\in Z_{p-1}^*$).

(2) The signature generating unit 33 calculates:

$$r' = \alpha^{k'} \bmod p.$$

(3) The signature generating unit 33 calculates:

$$s' = (H_0(m') - s_j' \cdot r') \cdot (k')^{-1} \bmod (p-1).$$

(4) The user j terminal device 30 transmits m' and the r' and s' obtained by the signature generating unit 33 together with the anonymous public key certificate (m, r) supplied from the certificate publisher Q terminal device 20, to the communication partner (in this example, user i terminal device 40).

Step S204 (2): Verification of Signature

When the user i terminal device 40 receives the anonymous public key certificate, the verification unit 45 confirms if the following equation is satisfied:

$$r'^{H0(m')} \equiv (\alpha^{H0(m)} \cdot v_Q^{-r})^{r'} \cdot (r')^{s'} \pmod{p}.$$

If it is confirmed that the equation is satisfied, the user i terminal device 40 can recognize that the signature of m' was generated by a user selected by the certificate publisher Q.

Step S204: for use of a public key cryptogram can be used for enciphering.

It is assumed herein that the user k terminal device 50 enciphers in the ElGamal cryptosystem.

Enciphering:

In the user k terminal device 50, the encipher unit 56 enciphers the plain text m" as in the following.

(1) The encipher unit 56 generates a random number k".

(2) The encipher unit 56 calculates:

$$C_1 = r^{k''} \bmod p.$$

(3) The encipher unit 56 calculates:

$$C_2 = m'' \cdot (\alpha^{H0(m)} \cdot v_Q^{-r} \bmod p)^{k''} \bmod p.$$

(4) The user k terminal device 50 transmits $C_1$ and $C_2$ calculated by the encipher unit 56 to the user j terminal device 30.

Deciphering:

When the user j terminal device 30 receives $C_1$ and $C_2$, the decoding unit 34 calculates:

$$m'' = C_2 / C_1^{s_j'} \bmod p$$

to thereby recover the plain text m".

In the above embodiment, Step S204 for use of the public key cryptogram uses the ElGamal cryptosystem. The embodiment is not limited only to the ElGamal cryptosystem, but public key cryptograms basing upon the discrete logarithm problem may also be used.

Next, the second embodiment will be described.

In the second embodiment, a modification of the digital signature method of the ElGamal cryptosystem is applied to the communication system of the first embodiment.

Therefore, the modulo arithmetic is performed by using p−1 in the ElGamal cryptosystem in the first embodiment, whereas the modulo arithmetic is performed by using a prime q (q divides p−1 without any remainder) in the second embodiment.

The structure of the communication system 100 used in the second embodiment is the same as the first embodiment, and so the detailed description thereof is omitted.

Figure 4:
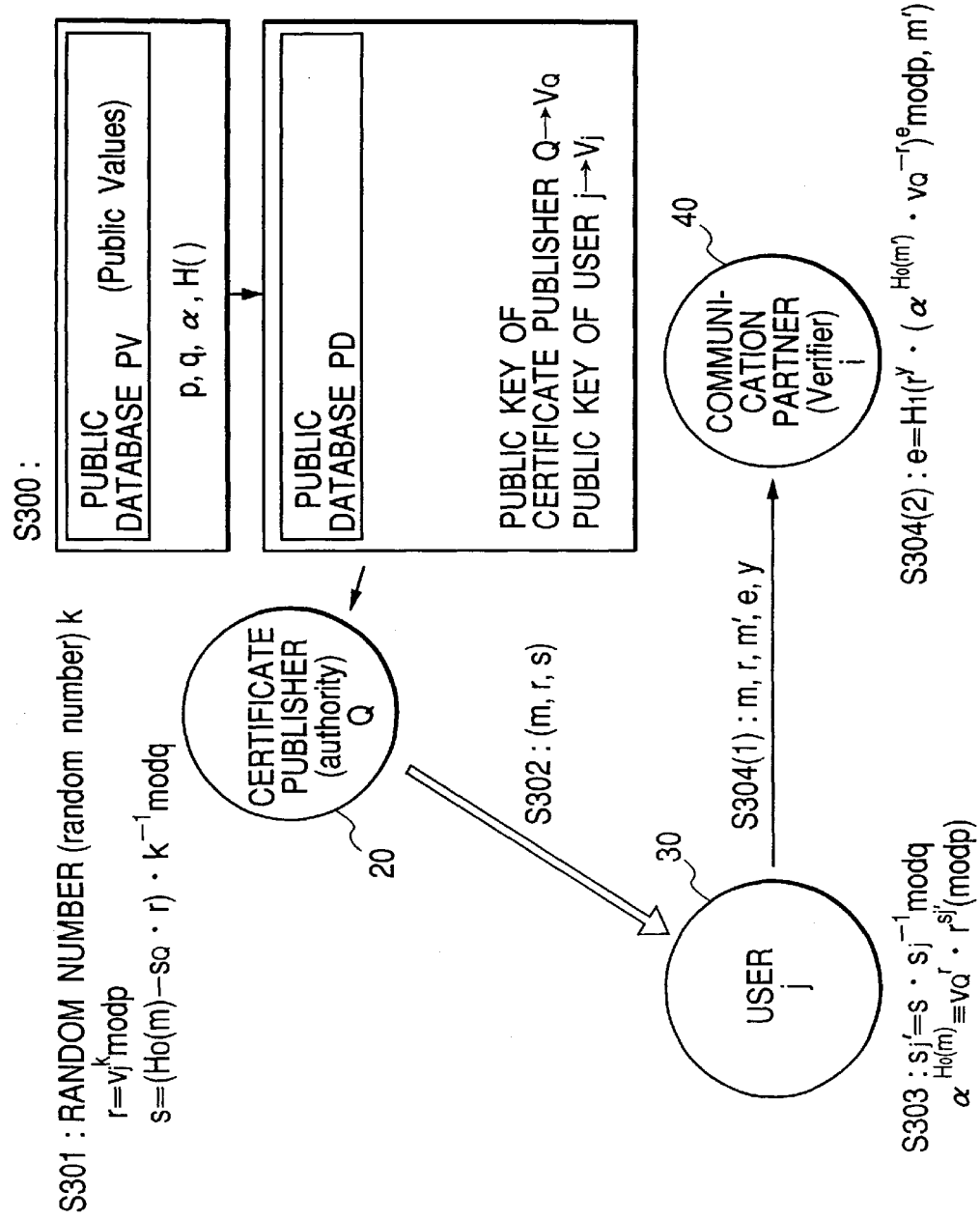
FIG. 4 is a diagram illustrating a digital signature method to be executed by the information system shown in FIG. 2, according to a second embodiment of the invention.

Only different points from the first embodiment will be specifically described with reference to FIG. 4.

Step S300:

Used as common data of the communication system 100 are large primes p and q (q divides p−1 without any remainder), $\alpha$ which is an element of $Z_p^*$ and an order q, and one way hash functions $H_0: Z \rightarrow Z_q \backslash \{0\}$ and $H_1: Z_q \times Z \rightarrow \{0, \ldots, 2^t - 1\}$.

It is assumed herein that "$p > 2^{512}$", "$q > 2^{160}$", and "$t > 72$".

These parameters (public parameters PV) can be accessed by all users participating in the communication system 100 and are registered in the public database PD properly managed so as not to be illegally altered or the like.

In the certificate publisher Q terminal device 20, the public key generating unit 21 generates a secret key $s_Q$ ($\in Z_q \backslash \{0\}$) and a public key $v_Q$ ($v_Q = \alpha^{s_Q}$ mod p) and registers the public key $v_Q$ in the public database PD.

In a user terminal device (in this example, the user j terminal device 30), the public key generating unit 31 generates a deciphering key (secret key) $s_j$ ($\in Z_q \backslash \{0\}$) and an enciphering key (public key) $v_j$ ($v_j = \alpha^{s_j}$ mod p) and registers the public key $v_j$ in the public database PD.

Step S301: Generation of Anonymous Public Key Certificate

In the certificate publisher Q terminal device 20, the signature generating unit 22 obtains r which is converted from the public key $v_j$ of the user j by using a random number k, and generates a signature (e.g., a digital signature of the ElGamal cryptosystem) of the plain text m.

More specifically, the signature generating unit 22 selects the random number (secret random number) k ($k \in Z_q \backslash \{0\}$) and calculates:

$$r = v_j^k \bmod p$$

$$s = (H_0(m) - s_Q \cdot r) \cdot k^{-1} \bmod q.$$

The digital signature (r, s) of the ElGamal cryptosystem of the plain text m is the anonymous public key certificate. The plain text m may be used as a parameter representative of the type of the anonymous public key certificate.

As the parameter representative of the type of the anonymous public key certificate, a predetermined fixed value may be used instead of the plain text m or $H_0(m)$.

Step S302: Delivery of Anonymous Public Key Certificate

Next, the certificate publisher Q terminal device 20 transmits as the anonymous public key certificate (m, r, s) the digital signature r and s generated by the signature generating unit 22 and the parameter m representative of the type of the anonymous public key certificate to the user j terminal device 30.

Step S303: Upon reception of the certificate, in the user j terminal device 80, the discrimination unit 32 obtains $$s_j' = s \cdot s_j^{-1} \bmod q,$$

and confirms whether the following is satisfied:

$$\alpha^{H0(m)} \equiv v_Q^r \cdot r^{s_j'} \pmod{p}$$

Step S304: Use of Public Key Cryptogram

The user j terminal device 30 uses the public key cryptogram basing upon the discrete logarithm problem, in accordance with $$\alpha^{H0(m)} \cdot v_Q^{-r} \equiv r^{s_j'} \pmod{p}$$

where "r" is a base, "$\alpha^{H0(m)} \cdot v_Q^{-r}$ mod p" is a public key, and "$s_j'$" is a secret key.

It is assumed herein that a digital signature of the Schnorr cryptosystem is used.

Step S304 (1): Generation of Digital Signature In the user j terminal device 30, the signature generating unit 33 generates a signature of a plain text m' as in the following.
(1) The signature generating unit 33 generates a random number k' ($\in Z_q \backslash \{0\}$).
(2) The signature generating unit 33 calculates:

$$x = r^{k'} \bmod p.$$

(3) The signature generating unit 33 calculates:

$$e = H_1(x, m').$$

(4) The signature generating unit 33 calculates:

$$y = k' - e \cdot s_j' \bmod q$$

(5) The user j terminal device 30 transmits m' and the e and y obtained by the signature generating unit 33 together with the anonymous public key certificate (m, r) supplied from the certificate publisher Q terminal device 20, to the communication partner (in this example, user i terminal device 40).

Step S304 (2): Verification of Signature When the user i terminal device 40 receives the anonymous public key certificate, the verification unit 45 confirms if the following equation is satisfied:

$$e = H_1(r^y \cdot (\alpha^{H0(m)} \cdot v_Q^{-r})^e \bmod p, m').$$

If it is confirmed that the equation is satisfied, the user i terminal device 40 can recognize that the signature of m' was generated by a user selected by the certificate publisher Q.

Step S304 for use of a public key cryptogram can be used for enciphering.

It is assumed herein that the user k terminal device 50 enciphers in the ElGamal cryptosystem.

Enciphering:
In the user k terminal device 50, the encipher unit 56 enciphers the plain text m" as in the following.
(1) The encipher unit 56 generates a random number k".
(2) The encipher unit 56 calculates:

$$C_1 = r^{k''} \bmod p.$$

(3) The encipher unit 56 calculates:

$$C_2 = m'' \cdot (\alpha^{H0(m)} \cdot v_Q^{-r} \bmod p)^{k''} \bmod p.$$

(4) The user k terminal device 50 transmits $C_1$ and $C_2$ calculated by the encipher unit 56 to the user j terminal device 30.

Deciphering:
When the user j terminal device 30 receives $C_1$ and $C_2$, the decoding unit 34 calculates:

$$m'' = C_2 / C_1^{s_j'} \bmod p$$

to thereby recover the plain text m".

In the above embodiment, Step S304 for use of the public key cryptogram uses the ElGamal cryptosystem and Schnorr cryptosystem. The embodiment is not limited only to the ElGamal and Schnorr cryptosystems, but public key cryptograms basing upon the discrete logarithm problem may also be used.

Next, the third embodiment will be described.

In the third embodiment, a modification of the digital signature method of the ElGamal cryptosystem is applied to the communication system of the first embodiment.

Therefore, similar to the first embodiment, $H_0(m)=0$ when the plain text m ($H_0(m)$ calculated from the plain text m) is used for the anonymous public key certificate in the third embodiment.

The structure of the communication system 100 used in the third embodiment is the same as the first embodiment, and so the detailed description thereof is omitted.

Figure 5:
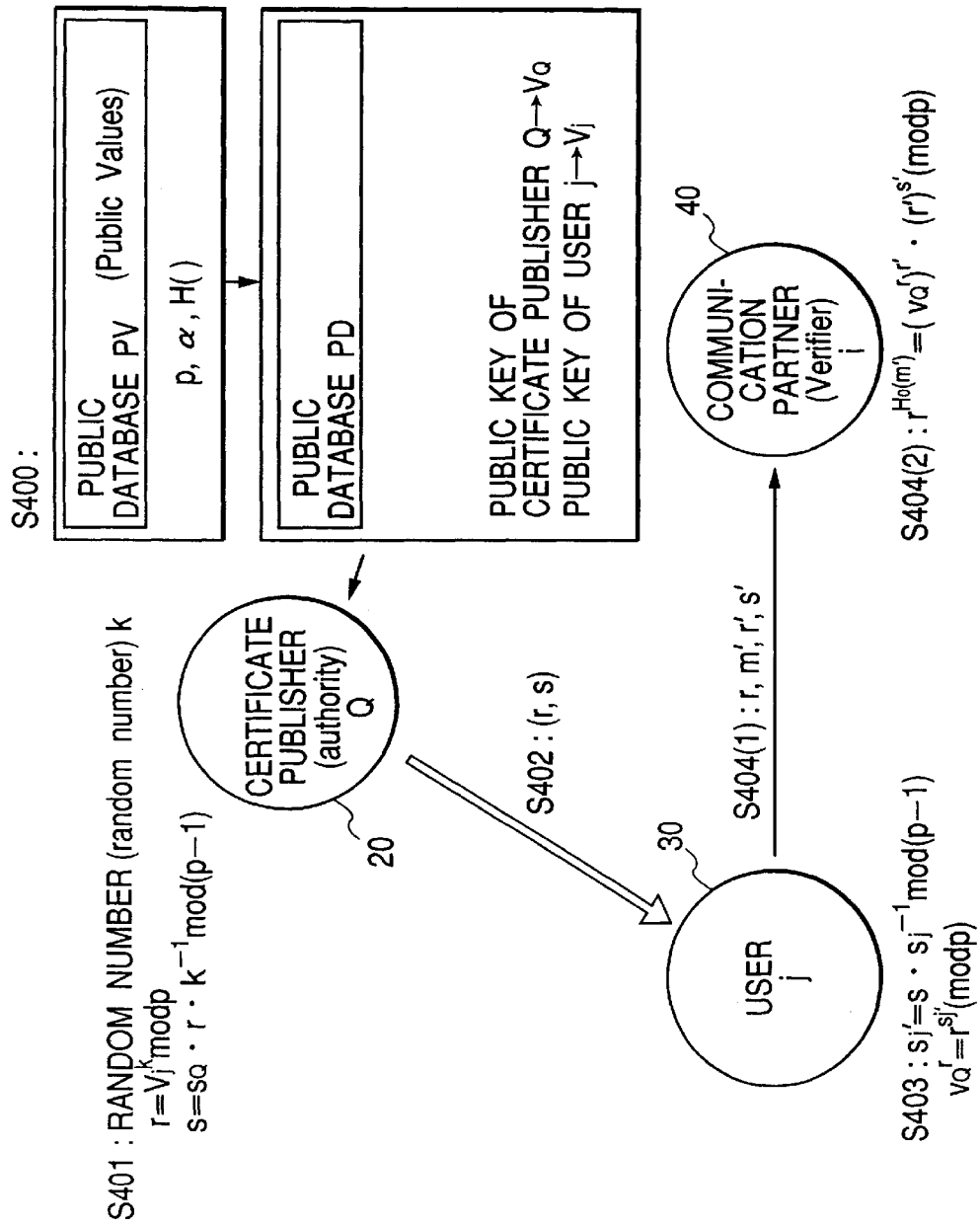
FIG. 5 is a diagram illustrating a digital signature method to be executed by the information system shown in FIG. 2, according to a third embodiment of the invention.

Only different points from the first embodiment will be specifically described with reference to FIG. 5.

Step S400: Used as common data of the communication system 100 are a prime p, $\alpha$ which is an element of $Z_p^*$ and an order p−1, and a one way hash function $H_0: Z \rightarrow Z_p \backslash \{0\}$.

It is assumed herein that $p = "p > 2^{512}"$.

These parameters (public parameters PV) can be accessed by all users participating in the communication system 100 and are registered in the public database PD properly managed so as not to be illegally altered or the like.

In the certificate publisher Q terminal device 20, the public key generating unit 21 generates a secret key $s_Q$ ($\in Z_{p-1}^*$) and a public key $v_Q$ ($v_Q = \alpha^{s_Q} \bmod p$) and registers the public key $v_Q$ in the public database PD.

In a user terminal device (in this example, the user j terminal device 30), the public key generating unit 31 generates a deciphering key (secret key) $s_j$ ($\in Z_{p-1}^*$) and an enciphering key (public key) $v_j$ ($v_j = \alpha^{s_j} \bmod p$) and registers the public key $v_j$ in the public database PD.

Step S401: Generation of Anonymous Public Key Certificate

In the certificate publisher Q terminal device 20, the signature generating unit 22 obtains r which is converted from the public key $v_j$ of the user j by using a random number k, and generates a modified digital signature of the ElGamal cryptosystem, e.g., a signature of the ElGamal cryptosystem in which an output "0" is obtained when the plain text m is input to the hash function.

More specifically, the signature generating unit 22 selects the random number (secret random number) k (k $\in Z_{p-1}^*$) and calculates:

$$r = V_j^k \bmod p$$

$$s = S_Q \cdot r \cdot k^{-1} \bmod (p-1).$$

The digital signature (r, s) is the anonymous public key certificate.

Step S402: Delivery of Anonymous Public Key Certificate

Next, the certificate publisher Q terminal device 20 transmits as the anonymous public key certificate (r, s) the digital signature r and s generated by the signature generating unit 22 to the user j terminal device 30.

Step S403:
Upon reception of the certificate, in the user j terminal device 80, the discrimination unit 32 obtains $$s_j' = s \cdot s_j^{-1} \bmod (p-1),$$

and confirms whether the following is satisfied:

$$v_Q' = r^{s_j'} \pmod{p}.$$

Step S404: Use of Public Key Cryptogram

The user j terminal device 30 uses the public key cryptogram basing upon the discrete logarithm problem, in accordance with $$V_Q^{r'=rsj'} \pmod{p}$$

where "r" is a base, "$V_Q^r$ mod p" is a public key, and "$s_j'$" is a secret key.

It is assumed herein that a digital signature of the ElGamal cryptosystem is used.

Step S404 (1): Generation of Digital Signature

In the user j terminal device 30, the signature generating unit 33 generates a signature of a plain text m' as in the following.

(1) The signature generating unit 33 generates a random number k' ($\in Z_{p-1}^*$).

(2) The signature generating unit 33 calculates:

$$r'=\alpha^{k'} \bmod p.$$

(3) The signature generating unit 33 calculates:

$$s'=(H(m')-s_j'\cdot r)\cdot(k')^{-1} \bmod (p-1).$$

(4) The user j terminal device 30 transmits m' and the r'' and e' obtained by the signature generating unit 33 together with the anonymous public key certificate (m, r) supplied from the certificate publisher Q terminal device 20, to the communication partner (in this example, user i terminal device 40).

Step S404 (2): Verification of Signature

When the user i terminal device 40 receives the anonymous public key certificate, the verification unit 45 confirms if the following equation is satisfied:

$$r^{H0(m')} \equiv (v_Q')^{r'} \cdot (r')^{s'} \pmod{p}.$$

If it is confirmed that the equation is satisfied, the user i terminal device 40 can recognize that the signature of m' was generated by a user selected by the certificate publisher Q.

Step S404 for use of a public key cryptogram can be used for enciphering.

It is assumed herein that the user k terminal device 50 enciphers in the ElGamal cryptosystem.

Enciphering:

In the user k terminal device 50, the encipher unit 56 enciphers the plain text m'' as in the following.

(1) The encipher unit 56 generates a random number k''.
(2) The encipher unit 56 calculates:

$$C_1 = r^{k''} \bmod p.$$

(3) The encipher unit 56 calculates:

$$C_2 = m'' \cdot (v_Q^r \bmod p)^{k''} \bmod p.$$

(4) The user k terminal device 50 transmits $C_1$ and $C_2$ calculated by the encipher unit 56 to the user j terminal device 30.

Deciphering:

When the user j terminal device 30 receives $C_1$ and $C_2$, the decoding unit 34 calculates:

$$m'' = C_2/C_1^{s_j'} \bmod p$$

to thereby recover the plain text m''.

In the above embodiment, Step S404 for use of the public key cryptogram uses the ElGamal cryptosystem. The embodiment is not limited only to the ElGamal cryptosystem, but public key cryptograms basing upon the discrete logarithm problem may also be used.

In the embodiments described above, p is a prime, the order of $\alpha$ is p-1, $r \equiv v_j^k \equiv \alpha^{sjk} \pmod{p}$, $s_j \in Z_{p-1}^*$ and $k \in Z_{p-1}^*$. Alternatively, p and q are primes, q divides p-1 without any remainder, the order of $\alpha$ is q, $r \equiv v_j^k \equiv \alpha^{sjk} \pmod{p}$, $s_j \in Z_q \backslash \{0\}$, and $k \in Z_q \backslash \{0\}$.

Therefore, if an arbitrary r is given, the value of r can be calculated by using a public key of any user. It is quite impossible to identify the public key of a user used for the calculation of the value r, unless the value of actually used k is not known. In other words, the signature r of the anonymous public key certificate does not contain at all the information which can identify the user having the anonymous public key certificate. Anonymity can be ensured not from the standpoint of calculation amount like the assumption 2 but from the standpoint of information amount. Even if there occurs the case where the assumption 2 is not satisfied, anonymity can be reliably ensured. It is therefore possible to improve safety of privacy protection.

In any of the above embodiments, safety of privacy protection can be further improved by performing the following operations.

(1) The certificate publisher Q terminal device 20 transmits an anonymous public key certificate to an arbitrary user terminal device (e.g., user j terminal device 30), by using each time a different random number.

(2) Upon reception of the anonymous public key certificate, the user j terminal device 30 does not generate a digital signature but uses one anonymous public key certificate for each different plain text.

With such a way to use the anonymous public key certificate (one-time certificates, the certificate is used only once and thereafter it is discarded), judging whether or not the user generated an arbitrary digital signature is the same as the user generated a different digital signature, is very difficult or impossible from the standpoint of information amount for users other than the certificate publisher Q and the user generated the arbitrary digital signature. Since anonymity of a user can be retained from the standpoint of information amount, safety of privacy protection can be further improved.

As described above, according to the embodiments, the signature of the anonymous public key certificate does not contain at all the information identifying the user having the anonymous public key certificate. Accordingly, anonymity can be retained not from the standpoint of calculation amount like the assumption 2 but from the standpoint of information amount. Therefore, even if there occurs the case where the assumption 2 is not satisfied, anonymity can be reliably ensured. It is therefore possible to improve safety of privacy protection.

Next, the fourth embodiment of the invention will be described.

Figure 6:
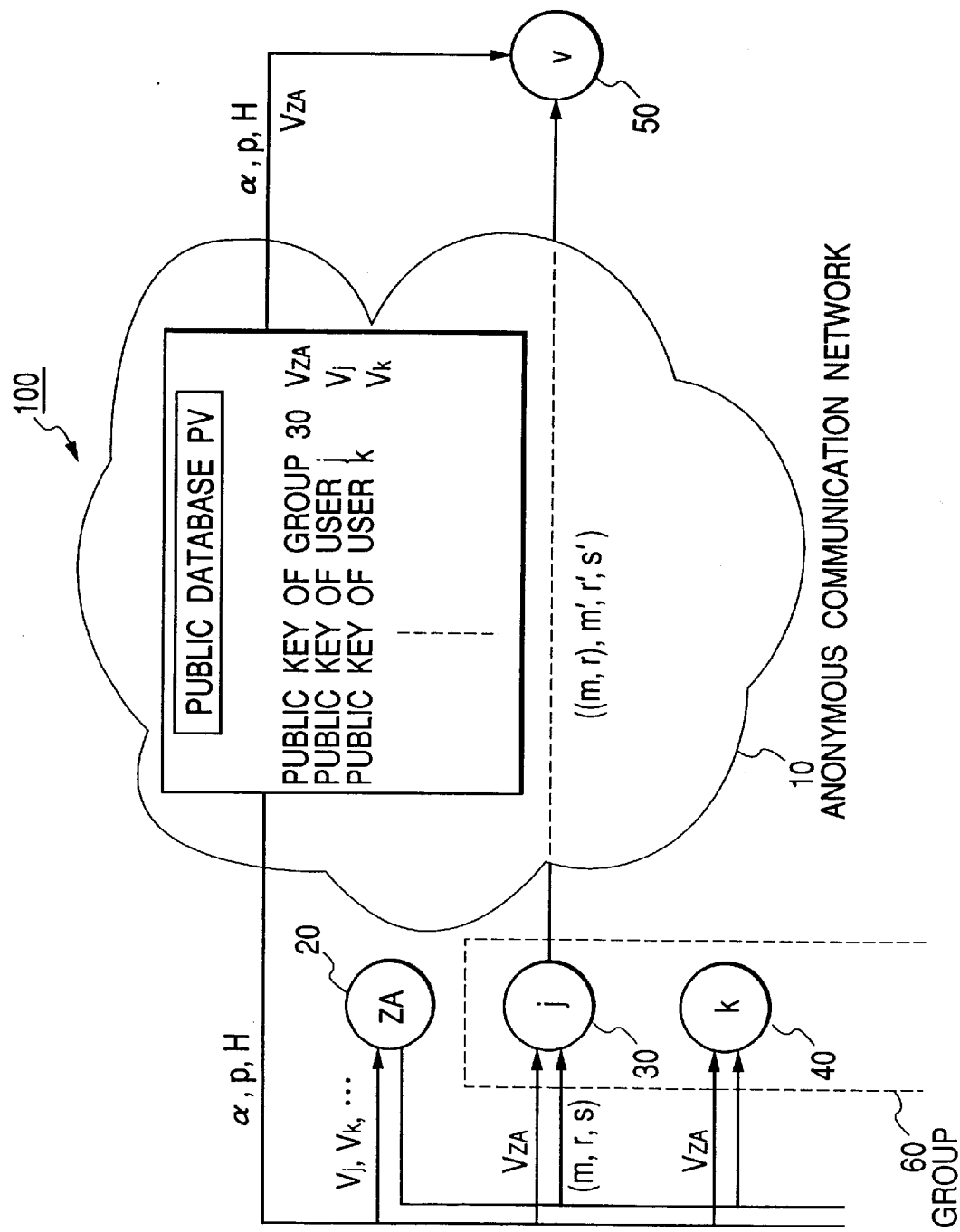
FIG. 6 is a block diagram showing a communication system utilizing an information communication system according to a fourth embodiment of the invention.

The digital signature method of this invention is executed by a communication system 100 such as shown in FIG. 6. The communication system 100 utilizes an information communication system of the invention.

In the communication system 100, a certificate publisher ZA terminal device 20 and a plurality of user terminal devices 30, 40, 50, . . . of users j, k, v, . . . are connected to a communication network (anonymous communication network) 10. Each user can anonymously communicates with another user via the communication network 10.

The communication system 100 is provided with a public database PD which can be accessed by the certificate publisher ZA and users j, k, v, . . . Public keys of users, common parameters, and the like are registered in the public database PB. The public database PD are properly managed so that the information registered therein is not illegally altered or the like.

The concept of the communication system 100 will be described. In the communication system 100, a public key "$v_{ZA}$" is used for an arbitrary group 60 which is constituted of members including users j and k.

The users j and k belonging to the same group 60 is supplied with an anonymous public key certificate (m, r, s) from the certificate publisher ZA. For example, the user j generates a signature portion (m', r', s') specific to the user in accordance with the anonymous public key certificate (m, r, s), and transmits a group signature ((m, r), m', r', s') to a user V via the anonymous communication network 10. The user V received the group signature verifies the group signature of a message m' by using the public key $v_{ZA}$.

Figure 7:
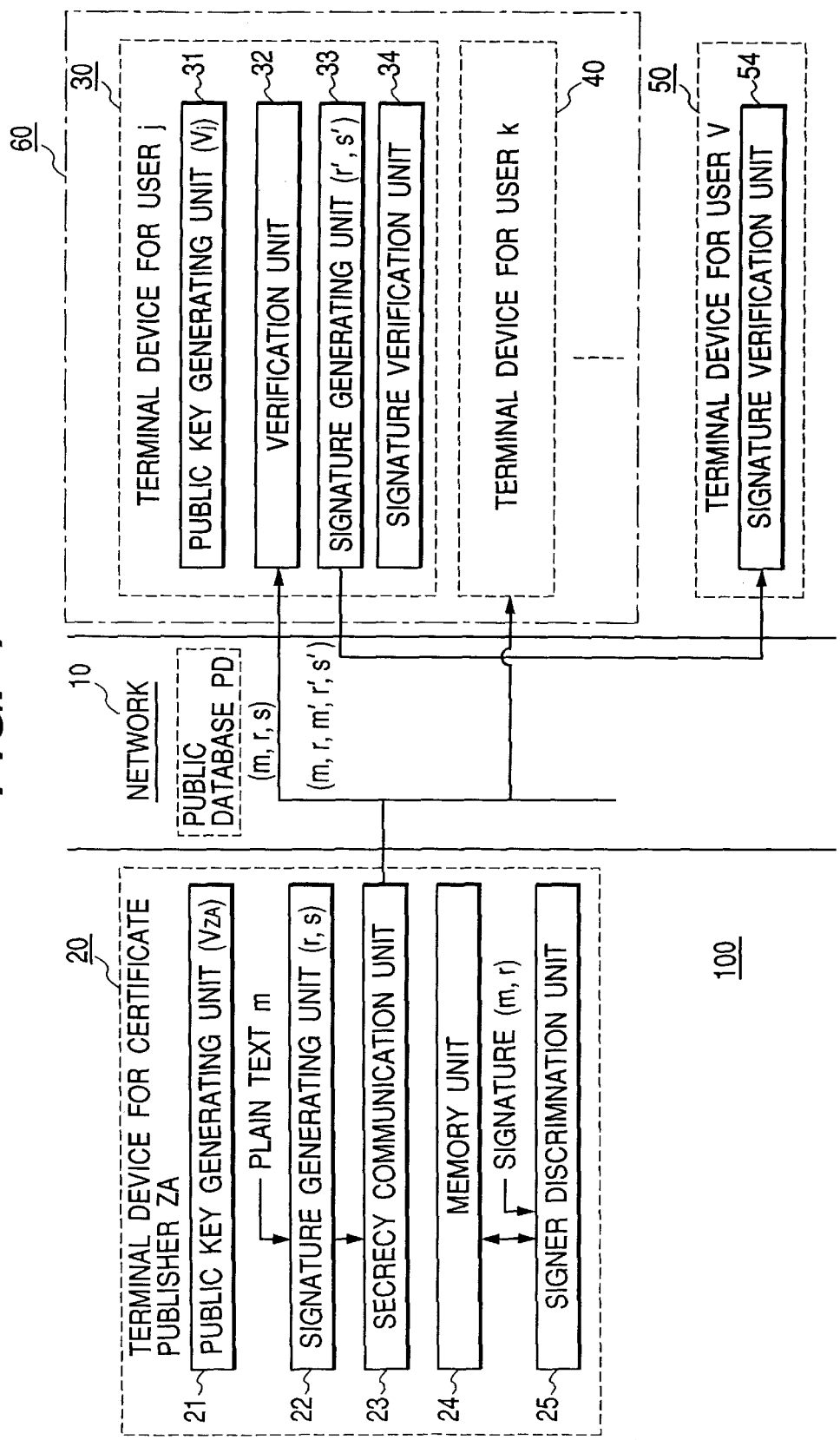
FIG. 7 is a block diagram showing the detailed configuration of the communication system shown in FIG. 6.

The structures of the certificate publisher ZA terminal device 20 and the user terminal devices 30, 40, 50, . . . of the users j, k, v, . . . are shown in FIG. 7.

Namely, the certificate publisher ZA terminal device 20 is an authority of the group 60 and has a public key generating unit 21 for generating a secret key $s_{ZA}$ (secret information) and a public key $v_{ZA}$ (public information), a signature generating unit 22 for generating an anonymous public key certificate (hereinafter called a signature of member information where applicable) of a plain text m in accordance with the public key specific to the user of the group 60, and a secrecy communication unit 23 for transmitting in secret a signature generated by the signature generating unit 22 to the user of the group 60.

The certificate publisher ZA terminal device 20 also has a memory unit 24 for storing each random number corresponding to each signature to be issued, and a signature discrimination unit 25 for identifying an arbitrary user in the group 60 generated a signature in accordance with the information stored in the memory unit 24 and a random number used for generating the signature by the user.

The user terminal devices 30, 40, 50, . . . each have the same structure.

For example, the user j terminal device 30 has a public key generating unit 31 for generating a secret key $s_j$ specific to the user j and a public key $v_j$, a verification unit 32 for confirming a signature from the certificate publisher ZA terminal device 20 satisfies a predetermined relation, and a signature generating unit 33 for generating a signature corresponding to digital information by using the signature verified by the verification unit 32.

The user j terminal device 30 also has a signature verification unit 35 for verifying a signature by using the public key of the certificate publisher ZA terminal device 20.

The group signature of the communication system will be described specifically with reference to FIGS. 7 and 8.

Step S200: Used as common data of the communication system 100 are a large prime p, a which is an element of $Z_p^*$ and an order p−1, and a one way hash function $H_0: Z \to Z_p \backslash \{0\}$.

It is assumed herein that p is "p>$2^{512}$".

These parameters (public parameters PV (Public Values)) are registered in the public database PD.

In the certificate publisher ZA terminal device 20 which is a trusted authority of the group 60, the public key generating unit 21 generates a secret key (deciphering key) $s_{ZA}$ ($\in Z_{p-1}^*$) and a public key (enciphering key) $v_{ZA}$ ($v_{ZA} = \alpha^{s_{ZA}}$ mod p) and registers the public key $v_{ZA}$ in the public database PD.

In an arbitrary user terminal device of the group 60 (in this example, the user (member) j terminal device 30), the public key generating unit 31 generates a deciphering key (secret key) $s_j$ ($\in Z_{p-1}^*$) and an enciphering key (public key) $v_j$ ($v_j = \alpha^{s_j}$ mod p) and registers the public key $v_j$ in the public database PD.

Step S201: Generation of Anonymous Public Key Certificate

In the certificate publisher ZA terminal device 20, the signature generating unit 22 obtains r which is converted from the public key $v_j$ of the user j by using a random number k, and generates a signature (e.g., a digital signature of the ElGamal cryptosystem) of the plain text m.

More specifically, the signature generating unit 22 selects the random number (secret random number) k (k $\in Z_{p-1}^*$) and calculates:

$$r = V_j^k \bmod p$$

$$s = (H_0(m) - s_{ZA} \cdot r) \cdot k^{-1} \bmod (p-1).$$

The digital signature (r, s) of the ElGamal cryptosystem of the plain text m is the anonymous public key certificate. The plain text m may be used as a parameter representative of the type of the anonymous public key certificate.

As the parameter representative of the type of the anonymous public key certificate, a predetermined fixed value may be used instead of the plain text m or $H_0(m)$.

Step S202: Delivery of Anonymous Public Key Certificate

Next, in the certificate publisher ZA terminal device 20, the secrecy communication unit 20 transmits as the anonymous public key certificate (m, r, s) the digital signature r and s generated by the signature generating unit 22 and the parameter m representative of the type of the anonymous public key certificate to the user j terminal device 30.

Step S203: Upon reception of the certificate, in the user j terminal device 80, the verification unit 32 judges in the following manner whether the anonymous public key certificate (m, r, s) from the certificate publisher ZA terminal device 20 was issued to the user j. The verification unit 32 obtains $$s_j' = s \cdot s_j^{-1} \bmod (p-1),$$

and confirms whether the following is satisfied:

$$\alpha^{H_0(m)} \equiv v_{ZA}^r \cdot r^{s_j'} \pmod{p}$$

Step S204: Generation of Group Signature

The user j terminal device 30 generates a digital signature by using the public key cryptogram basing upon the discrete logarithm problem, in accordance with $$\alpha^{H_0(m)} \equiv v_{ZA}^{-r} \equiv r^{s_j'} \pmod{p}$$

where "r" is a base, "$\alpha^{H_0(m)} \equiv v_{ZA}^{-r}$ mod p" is a public key, and "$s_j'$" is a secret key.

For example, in generating a digital signature of the ElGamal cryptosystem, the signature generating unit 33 of the user j terminal device 30 generates a digital signature of a plain text (message) m' in the following manner.

(1) The signature generating unit 33 generates a random number k' ($\in Z_{p-1}^*$).

(2) The signature generating unit 33 calculates:

$$r' = \alpha^{k'} \bmod p.$$

(3) The signature generating unit 33 calculates:

$$s' = (H_0(m') - s_j' \cdot r) \cdot (k')^{-1} \bmod (p-1).$$

(4) The user j terminal device 30 transmits m' and the r' and s' obtained by the signature generating unit 33 together with the anonymous public key certificate (m, r) supplied from the certificate publisher ZA terminal device 20, to the communication partner (in this example, user v terminal device 50).

Step S205: Verification of Signature

When the user v terminal device 50 receives the anonymous public key certificate, the signature verification unit 54 confirms if the following equation is satisfied:

$$r^{H0(m')} \equiv (\alpha^{H0(m)} \cdot v_{ZA}^{-r})^{r'} \cdot (r')^{s'} \pmod{p}.$$

If it is confirmed that the equation is satisfied, the user v terminal device 50 can recognize that the signature of m' was generated by a user received the anonymous public key certificate from the certificate publisher ZA, i.e., the signature was generated by the member of the group 60.

Identifying the user generated an arbitrary group signature, i.e., disclosing the group signature, is performed in the following manner.

It is herein assumed that the group signature is ((m, r), m', r', s'), the signed user is the user j, and $r=v_j \bmod p$.

In this case, in issuing the anonymous public key certificate, the certificate publisher ZA terminal device 20 stores the user identification and a corresponding random number in the memory unit 24. When the group signature (m, r) to be disclosed is given to the certificate publisher ZA terminal device 20, the signature discrimination unit 20 thereof searches the stored contents in the memory unit 24 and confirms that $r=v_j \bmod p$. The certificate publisher ZA terminal device 20 can therefore know that the signed user is the user j.

The certificate publisher ZA terminal device 20 also verifies:

$$\log[g](g^{H0(m)}vZA^{-r})^{s-1}=\log[v_j]r(=k)$$

by obtaining "s" of the anonymous public key certificate (m, r, s) and using a zero knowledge verifying protocol for verifying the discrete logarithms are equal.

An example of the zero knowledge verifying protocol for verifying the discrete logarithms are equal, will be given in the following.

A zero knowledge verifying protocol for verifying:

$$\log[g]x=\log[\alpha]y(=s).$$

(1) The user v terminal device 50 selects random numbers a and b (a, b $\in Z_q$) and calculates $$c=g^a\alpha^b$$

to transmit c to a verifier P terminal device (certificate publisher ZA terminal device 20).

(2) The verifier P terminal device selects a random number t ($t \equiv Z_q$) and calculates $$h_1=c\cdot\alpha^t$$

$$h_2=h_1^s$$

to transmit $h_1$ and $h_2$ to the user v terminal device 50.

(3) The user v terminal device 50 transmits the random numbers a and b to the verifier P terminal device.

(4) The verifier P terminal device confirms whether the following equation is satisfied:

$$c=g^a\alpha^b$$

If satisfied, a random number t is transmitted to the user v terminal device 50.

(5) The user v terminal device 50 confirms whether the following equations are satisfied:

$$h_1=g^a\alpha^{b+t}$$

$$h_2=x^ay^{b+t}.$$

The protocol for verifying that $\log[g] x = \log[\alpha] y (=s)$ is not limited to the above-described protocol including (1) to (5), other similar protocols may also be used.

Next, the fifth embodiment will be described.

In the fifth embodiment, a modification of the digital signature method of the ElGamal cryptosystem is applied to the communication system of the fourth embodiment.

Therefore, the modulo arithmetic is performed by using p−1 in the ElGamal cryptosystem in the forth embodiment, whereas the modulo arithmetic is performed by using a prime q in the fifth embodiment.

The structure of the communication system 100 used in the fifth embodiment is the same as the fourth embodiment, and so the detailed description thereof is omitted.

Only different points from the fourth embodiment will be specifically described with reference to FIG. 9.

Step S300: Used as common data of the communication system 100 are large primes p and q (p|p−1, namely q divides p−1 without any remainder), a which is an element of $Z_p^*$ and an order q, and one way hash functions $H_1:Z \to Z_q \backslash \{0\}$ and $H_2:Z_p \times Z \to \{0, \ldots, 2^t-1\}$.

It is assumed herein that "$p>2^{512}$", "$q>2^{160}$", and "$t>72$". These parameters (public parameters PV) are registered in the public database PD.

In the certificate publisher ZA terminal device 20, the public key generating unit 21 generates a secret key $s_{ZA}$ ($\in Z_q \backslash \{0\}$) and a public key $v_{ZA}$ ($v_{ZA}=\alpha^{s_{ZA}} \bmod p$) and registers the public key $v_{ZA}$ in the public database PD.

In an arbitrary user terminal device (in this example, the user j terminal device 30), the public key generating unit 31 generates a deciphering key (secret key) $s_j$ ($\in Z_q \backslash \{0\}$) and an enciphering key (public key) $v_j$ ($v_j=\alpha^{s_j} \bmod p$) and registers the public key $v_j$ in the public database PD.

Step S301: Generation of Anonymous Public Key Certificate

In the certificate publisher ZA terminal device 20, the signature generating unit 22 obtains r which is converted from the public key $v_j$ of the user j by using a random number k, and generates a signature (e.g., a digital signature of the ElGamal cryptosystem) of the plain text m.

More specifically, the signature generating unit 22 selects the random number (secret random number) k ($k \in Z_q \backslash \{0\}$) and calculates:

$$r=V_j^k \bmod p$$

$$s=(H_1(m)-s_{ZA}\cdot r)\cdot k^{-1} \bmod q.$$

The digital signature (r, s) of the ElGamal cryptosystem of the plain text m is the anonymous public key certificate. The plain text m may be used as a parameter representative of the type of the anonymous public key certificate.

As the parameter representative of the type of the anonymous public key certificate, a predetermined fixed value may be used instead of the plain text m or $H_0(m)$.

Step S302: Delivery of Anonymous Public Key Certificate

Next, in the certificate publisher ZA terminal device 20, the secrecy communication unit 23 transmits as the anonymous public key certificate (m, r, s) the digital signature r and s generated by the signature generating unit 22 and the parameter m representative of the type of the anonymous public key certificate to the user j terminal device 30.

Step S303:

Upon reception of the certificate, in the user j terminal device 80, the verification unit 32 obtains $$s_j' = s \cdot s_j^{-1} \bmod q,$$

and confirms whether the following is satisfied:

$$\alpha^{H1(m)} \equiv v_{ZA}' \cdot r^{s_j'} \pmod{p}$$

Step S304: Generation of Group Signature

The user j terminal device 30 generates a digital signature basing upon the discrete logarithm problem, in accordance with $$\alpha^{H1(m)} \cdot v_{ZA}^{-r} \equiv r^{s_j'} \pmod{p}$$

where "r" is a base, "$\alpha^{H1(m)} \cdot v_{ZA}^{-r} \bmod p$" is a public key, and "$s_j'$" is a secret key.

For example, in generating a digital signature of the Schnorr cryptosystem, the signature generating unit 33 of the user j terminal device 30 generates a digital signature of a plain text (message) m' in the following manner.

(1) The signature generating unit 33 generates a random number k' ($\in Z_{p-1}^*$).

(2) The signature generating unit 33 calculates:

$$x = r^{k'} \bmod p.$$

(3) The signature generating unit 33 calculates:

$$e = H_2(x, m').$$

(4) The signature generating unit 33 calculates:

$$y = k' - e \cdot s_j' \bmod q.$$

(5) The user j terminal device 30 transmits m' and the e and y obtained by the signature generating unit 33 together with the anonymous public key certificate (m, r) supplied from the certificate publisher ZA terminal device 20, to the communication partner (in this example, user v terminal device 50).

Step S305: Verification of Signature

When the user v terminal device 50 receives the anonymous public key certificate, the signature verification unit 54 confirms if the following equation is satisfied:

$$e = H_2(r^y \cdot (\alpha^{H1(m)} \cdot v_{ZA}^{-r})^e \bmod p, m')$$

If it is confirmed that the equation is satisfied, the user v terminal device 50 can recognize that the signature of m' was generated by a user received the anonymous public key certificate from the certificate publisher ZA, i.e., the signature was generated by the member of the group 60.

"Disclosure of group signature" in the fifth embodiment is similar to that in the fourth embodiments, and so the detailed description thereof is omitted.

As described so far, according to the fourth and fifth embodiments, anonymity of a group signature can be retained from the standpoint of information amount. Therefore, even if there occurs the case wherein the comparison problem of discrete algorithms is solved, anonymity of the group signature can be retained. It is possible to reliably improve safety of privacy protection more than a conventional method, and anonymity of the group signature can be reliably retained in any circumstance.

Even if a new group is formed or a new member is added to the existing group, two-way communication between the member and authority is not necessary. Therefore, without two-way communication between a member and an authority, anonymity of a group signature can be reliably and efficiently retained.

An arbitrary user may perform the function of an authority.

What is claimed is:

1. A digital signature method including a public information generating step of generating public information specific to each user in accordance with a public parameter which satisfies a predetermined condition and is common to each user, and secret information specific to each user, a signature generating step of generating a signature of digital information by converting the digital information by using the secret information and the public parameter, and a signature discrimination step of verifying whether a relation between the digital information and the signature is correct, by using the public parameter and the public information, the digital signature method comprising:

a user information generating step of generating new secret information specific to the user, a new parameter, and new public information by using the public information;

a confirmation step of confirming whether or not the new secret information, new parameter, and new public information generated by said user information generating step satisfy a predetermined relation; and an enciphering step of enciphering digital information by using the new parameter and the new public information confirmed by said confirmation step.

2. A digital signature method according to claim 1, further comprising a deciphering step of deciphering an enciphered text enciphered by said enciphering step, by using the new parameter and the new secret information confirmed by said confirmation step.

3. A digital signature method including a public information generating step of generating public information specific to each user in accordance with a public parameter which satisfies a predetermined condition and is common to each user, and secret information specific to each user, a first signature generating step of generating a signature of digital information by converting the digital information by using the secret information and the public parameter, and a first signature discrimination step of verifying whether a relation between the digital information and the signature is correct, by using the public parameter and the public information, the digital signature method comprising:

a user information generating step of generating new secret information specific to the user, a new parameter, and new public information by using the public information;

a confirmation step of confirming whether or not the new secret information, the new parameter, and the new public information generated by said user information generating step satisfy a predetermined relation; and a second signature generating step of generating a signature of digital information by using the new parameter and the new public information confirmed by said confirmation step.

4. A digital signature method according to claim 3, further comprising a second signature discriminating step of confirming whether or not a relation between the signature generated by said second signature generating step and corresponding digital information is correct, by using the new parameter and the new public information confirmed by said confirmation step.

5. A digital signature method including a public information generating step of generating public information of each user, the public information being a result of an exponent calculation using a base value which satisfies a predetermined condition and is common to a plurality of users, and secret information of each user as an exponent value, the method comprising:

a secret information generating step of generating new secret information of a user in accordance with a signature of a plain text generated by using the public information of the user as a common base value and the secret information of the user;

a parameter generating step of generating a new parameter corresponding to the new secret information generated by said secret information generating step;

a public information generating step of generating new public information of the user in accordance with the signature, the public information of the user, the common base value, and the plain text; and a cryptogram execution step of executing a public key cryptogram by using the new secret information generated at said secret information generating step, the new parameter generated at said parameter generating step, and the new public information generated by said public information generating step.

6. A digital signature method according to claim 5, wherein security is retained basing upon a difficulty in obtaining a discrete logarithm.

7. A digital signature method according to claim 6, wherein the digital signature method is executed in an ElGamal cryptosystem.

8. A digital signature method according to claim 6, wherein the digital signature method is executed in a modification of an ElGamal cryptosystem.

9. A digital signature method according to claim 5, wherein the public key cryptogram relies security upon a difficulty in obtaining a discrete logarithm.

10. An information communication system using the digital signature method recited in any one of claims 1 to 9, the information communication system comprising:

user information generating means for generating different user information at a first user each time the method is invoked and supplying the different user information to a second user, the different user information including new secret information, a new parameter, and new public information;

user information verifying means for verifying that the user information supplied to the second user was generated by the first user with said user information generating means; and public key cryptogram operation executing means for executing an operation of a public key cryptogram by using the user information verified by said user information verifying means, wherein an identify the second user cannot be determined from the new parameter and the new public information generated by said user information generating means based on an amount of information.

11. A communication apparatus for executing a digital signature method, comprising:

public information generating means for generating public information specific to each user in accordance with a public parameter which satisfies a predetermined condition and is common to each user, and secret information specific to each user;

signature discriminating means for verifying whether a relation between received digital information and a signature of the received digital information is correct, by using the public parameter and the public information;

user information generating means for generating new secret information specific to the user, a new parameter, and new public information by using the public information;

confirming means for confirming whether or not the new secret information, the new parameter, and the new public information generated by said user information generating means satisfy a predetermined relation; and enciphering means for enciphering digital information by using the new parameter and the new public information confirmed by said confirming means.

12. A communication apparatus according to claim 11, further comprising signature generating means for generating a signature of digital information by using the new parameter and the new secret information conformed by said confirming means.

13. A communication apparatus for executing a digital signature method, comprising:

public information generating means for generating public information of each user, the public information being a result of an exponent calculation using a base value which satisfies a predetermined condition and is common to a plurality of users, and secret information of each user as an exponent value;

secret information generating means for generating new secret information of a user in accordance with a signature of digital information generated by using the public information of the user as a common base value and the secret information of the user;

parameter generating means for generating a new parameter corresponding to the new secret information generated by said secret information generating means;

public information generating means for generating new public information in accordance with the signature, the public information, the common base value, and the digital information; and cryptogram executing means for executing a public key cryptogram by using the new secret information generated by said secret information generating means, the new parameter generated by said parameter generating means, and the new public information generated by said public information generating means.

14. An information communication system including the communication apparatus recited in any one of claims 11 to 13.

15. A digital signature method comprising:

a public information generating step of generating public information specific to each user in accordance with a public parameter which satisfies a predetermined condition and is common to each user, and secret information specific to each user;

a member information generating step of generating member information by an authority of a group in accordance with the public information specific to each user belonging to the group, the member information including new secret information, a new parameter, and new public information;

a secrecy communication step of transmitting in secret the member information generated at said member information generating step to a user belonging to the group;

a member information confirmation step of confirming whether or not the member information generated at said member information generating step satisfies a predetermined relation;

a signature generating step of generating a signature corresponding to digital information by using the member information confirmed by said member information confirmation step;

a signature confirmation step of confirming whether or not the member information confirmed at said member information confirmation step and the signature generated at said signature generating step are valid, by using the public information generated by the authority; and a signed user identifying step of identifying a user that made the signature in accordance with a random number used when the signature is generated at said signature generating step.

16. A digital signature method according to claim 15, wherein said member information generating step includes a step of using an ElGamal cryptosystem using the public information specific to each user, in place of the public parameter common to each user.

17. A digital signature method according to claim 15, wherein said signature generating step includes a step of relying a basis of security upon a discrete logarithm problem.

18. A communication apparatus for communications between authority communication means of an arbitrary group and communication means of another user by using a digital signature method, the apparatus comprising:

public information generating means for generating specific public information which satisfies a predetermined condition in accordance with a common public parameter and specific secret information;

member information confirming means for confirming whether or not member information satisfies a predetermined relation, the member information being generated by said authority communication means in accordance with the public information, transmitted therefrom in secret, and including new secret information, a new parameter, and new public information;

signature generating means for generating a signature corresponding to digital information by using the member information confirmed by said member information confirming means;

transmitting means for transmitting the signature generated by said signature generating means to another user; and signature verifying means for verifying a signature of the other user by using the public information of the authority.

19. A communication apparatus for an authority of an arbitrary group for communicating with user communication means of a user at least belonging to the group by using a digital signature method, the communication apparatus comprising:

public information generating means for generating specific public information in accordance with a common public parameter which satisfies a predetermined condition, and specific secret information;

member information generating means for generating new secret information, a new parameter, and new public information in accordance with the public information specific to a user belonging to the group;

secrecy communication means for transmitting in secret the member information generated by said member information generating means to said user communication means of a user belonging to the group; and signed user identifying means for identifying a user that made a signature corresponding to digital information in accordance with a random number used for the signature generated by using the member information, if said user communication means of the user belonging to the group confirms that the member information generated by said member information generating means satisfies a predetermined relation.

20. An information communication system including at least the communication apparatus recited in any one of claims 18 to 19.

* * * * *

UNITED STATES PATENT AND TRADEMARK OFFICE
CERTIFICATE OF CORRECTION

PATENT NO. : 6,298,153 B1
DATED : October 2, 2001
INVENTOR(S) : Oishi

It is certified that error appears in the above-identified patent and that said Letters Patent is hereby corrected as shown below:

Title page,
Item [56], References Cited, U.S. PATENT DOCUMENTS, "Change et al." should read -- Chang et al. --.

Item [57], ABSTRACT,
Line 11, "has," should read -- has --.

Column 1,
Line 11, "wide spreads" should read -- wide spread use --;
Line 25, "communicate," should read -- communicate with, --; and
Line 36, "pertains" should read -- pertains to --.

Column 2,
Line 25, "to" should be deleted.

Column 3,
Line 51, "data" should read -- Data --.

Column 6,
Line 30, "received" should read -- receiving --;
Line 31, insert "is" before admitted and before "a";
Line 36, "singed" should read -- signed --; and
Line 43, begin a new paragraph after "Problem".

Column 15,
Line 10, begin a new paragraph after "Signature"; and
Line 32, begin a new paragraph after "Signature".

Column 17,
Line 6, " $V_Q^{r=sj'} \pmod{p}$ should read -- $V_Q^r \equiv r^{sj'} \pmod{p}$ --.

Column 18,
Line 2, "basing" should read -- based --;
Line 14, "at" should be deleted; and
Line 64, "communicates" should read -- communicate --.

Column 19,
Line 10, "is" should read -- are --; and
Line 55, Begin a new paragraph before "Used".

UNITED STATES PATENT AND TRADEMARK OFFICE
CERTIFICATE OF CORRECTION

PATENT NO. : 6,298,153 B1
DATED : October 2, 2001
INVENTOR(S) : Oishi

It is certified that error appears in the above-identified patent and that said Letters Patent is hereby corrected as shown below:

Column 21,
Line 15, "received" should read -- receiving --; and
Line 18, "generated" should read -- generating --.

Column 23,
Line 12, "basing" should read -- based --.

Column 25,
Line 26, "basing" should read -- based --; and
Line 35, "relies security" should read -- relies on security based --.

Column 26,
Line 18, "conformed" should read -- confirmed --.

Signed and Sealed this

Twenty-ninth Day of October, 2002

*Attest:*

*Attesting Officer*

JAMES E. ROGAN
*Director of the United States Patent and Trademark Office*